TIME ASSIGNMENT SIGNAL INTERPOLATION SYSTEM

Filed May 17, 1954 21 Sheets-Sheet 1

INVENTOR
R. L. CARBREY
BY Hugh S. Wertz
ATTORNEY

TIME ASSIGNMENT SIGNAL INTERPOLATION SYSTEM

Filed May 17, 1954 21 Sheets-Sheet 2

INVENTOR
R. L. CARBREY
BY Hugh S. Wertz
ATTORNEY

Oct. 6, 1959 R. L. CARBREY 2,907,829

TIME ASSIGNMENT SIGNAL INTERPOLATION SYSTEM

Filed May 17, 1954 21 Sheets-Sheet 3

INVENTOR
R. L. CARBREY
BY Hugh S. Wertz
ATTORNEY

INVENTOR
R. L. CARBREY
BY Hugh S. Wertz
ATTORNEY

INVENTOR
R. L. CARBREY
BY Hugh S. Wertz
ATTORNEY

Oct. 6, 1959 R. L. CARBREY 2,907,829

TIME ASSIGNMENT SIGNAL INTERPOLATION SYSTEM

Filed May 17, 1954 21 Sheets-Sheet 6

INVENTOR
R. L. CARBREY
BY Hugh S. Wertz
ATTORNEY

TIME ASSIGNMENT SIGNAL INTERPOLATION SYSTEM

Filed May 17, 1954 21 Sheets-Sheet 7

INVENTOR
R. L. CARBREY
BY Hugh S. Wertz
ATTORNEY

INVENTOR
R. L. CARBREY
BY Hugh S. Wertz
ATTORNEY

TIME ASSIGNMENT SIGNAL INTERPOLATION SYSTEM

Filed May 17, 1954 21 Sheets-Sheet 9

INVENTOR
R. L. CARBREY
BY Hugh S. Wertz
ATTORNEY

INVENTOR
R. L. CARBREY
BY Hugh S. Wertz
ATTORNEY

TIME ASSIGNMENT SIGNAL INTERPOLATION SYSTEM

Filed May 17, 1954 21 Sheets-Sheet 11

INVENTOR
R. L. CARBREY
BY Hugh S. Wertz
ATTORNEY

INVENTOR
R. L. CARBREY
BY Hugh S. Wertz
ATTORNEY

INVENTOR
R. L. CARBREY
BY Hugh S. Wertz
ATTORNEY

Oct. 6, 1959 R. L. CARBREY 2,907,829

TIME ASSIGNMENT SIGNAL INTERPOLATION SYSTEM

Filed May 17, 1954 21 Sheets-Sheet 14

INVENTOR
R. L. CARBREY
BY Hugh S. Wertz
ATTORNEY

INVENTOR
R. L. CARBREY
BY Hugh S. Wertz
ATTORNEY

INVENTOR
R. L. CARBREY
BY Hugh S. Wertz
ATTORNEY

TIME ASSIGNMENT SIGNAL INTERPOLATION SYSTEM

Filed May 17, 1954 21 Sheets-Sheet 17

INVENTOR
R. L. CARBREY
BY Hugh S. Wertz
ATTORNEY

INVENTOR
R. L. CARBREY
BY Hugh S. Wertz
ATTORNEY

INVENTOR
R. L. CARBREY
BY Hugh S. Wertz
ATTORNEY

INVENTOR
R. L. CARBREY
BY Hugh S. Wertz
ATTORNEY

INVENTOR
R. L. CARBREY
BY Hugh S. Wertz
ATTORNEY 2,907,829

TIME ASSIGNMENT SIGNAL INTERPOLATION SYSTEM

Robert L. Carbrey, Madison, N.J., assignor to Bell Telephone Laboratories, Incorporated, New York, N.Y., a corporation of New York Application May 17, 1954, Serial No. 430,181
23 Claims. (Cl. 179—15)

This invention relates to electrical switching systems.

In the use of expensive transmission facilities such as the channels in a transatlantic cable, it is important to make full use of all of the available channel time. Various systems for saving channel time have been proposed heretofore which utilize the statistical fact that telephone conversations use the facilities in one direction for less than one-third of the time, on the average. By interconnecting the two parties in the direction of transmission only when the line is active, large savings in channel time may be effected. The terminal switching facilities which perform this function have been termed "time assignment speech (or signal) interpolation" systems, and this is abridged to "TASI" for convenience. Most of the TASI systems which have been proposed heretofore have used various forms of "cross point" switching for interconnecting talker lines with output lines, and thus have required such a large amount of terminal equipment that their use has not been economically justified.

Accordingly, one object of the present invention is to reduce the cost of time assignment speech interpolation equipment.

To make full use of the statistical study mentioned above, it is desirable to have a fairly large number of talkers included in any one TASI system so that the overall activity pattern of the talkers will be very nearly random. Specifically, it has been conservatively estimated that 4 channels can handle the calls of 7 talkers, that 8 channels can handle the calls of 16 talkers, that 12 channels can handle the calls of 32 talkers, and that 30 channels can take care of 100 talkers. From the foregoing it may be observed that the effectiveness of TASI systems, as measured by the ratio of input talkers to output channels, goes up from 1.75 in the smallest TASI system noted above to 3.33 in the 100 talker TASI system.

In the cross point time assignment speech interpolation systems, every talker line is connected to every output line by a cross point switch. Therefore, the number of cross point switches required is the product of the talker lines and the output lines. When, in the interest of efficiency, it is desired to use a large number of talker lines and output channels, cross point TASI systems require an excessive number of switches. For example, in a cross point TASI system employing 12 channels and 32 talker lines, 384 cross point switches are required. Furthermore only 12 of these 384 switches are active at any one time while the remaining 372 switches are idle.

It has been found that the matrix of switches in a cross point TASI system performs both a switching function and a memory function, and further, that it is this combination of functions which accounts for much of the complexity of the system. In accordance with the present invention, TASI systems are greatly simplified by separating these switching and memory functions. More specifically, and in accordance with a specific illustrative embodiment of the invention, the use of time separation multiplex switching and a circulating memory unit has been found to reduce the required switching and control equipment for a 32 talker-12 line TASI system by more than one-half. A collateral feature of the invention is the implementation of the TASI time separation multiplexing through the use of circulating coded pulse groups to gate the desired circuits at the appropriate time.

Proceeding to another phase of TASI systems, the essential function of coordinating talker-to-channel assignments at the transmitter with channel-to-listener assignments at the receiver, will now be considered. In some TASI systems of the prior art so much control information must be systematically transmitted from the transmitter to the receiver that one signal channel must be set aside for control purposes. In other systems which have been proposed which do not use so much control information, the receiver is subject to loss of synchronism with respect to the transmitter under adverse operating conditions such as noise and interference, and may remain out of synchronism for substantial periods of time.

Another object of the invention is, therefore, the improvement of control facilities for assuring synchronization of the transmitter and receiver in time assignment signal interpolation systems.

In accordance with the present invention, an improved form of TASI transmitter-receiver operation, control and checking has been developed which avoids the use of an extra control channel by sending large amounts of information over idle channels. Various factors which enter into the improved control system include the reactivation of assigned channel space to minimize required control signalling, the use of in-band control signalling so that extra channels are not required, and the transmission of supplementary checking information during idle channel time.

Other objects and certain additional features and advantages will be developed in the course of the detailed description of the drawings.

In the drawings:

Figs. 1–A, 1–B and 1–C illustrate the orientation of sheets of drawings of certain of the other figures in the drawings;

Fig. 2 is a simplified functional diagram of the receiver of an improved time assignment signal interpolation system;

Figs. 3 through 5 constitute a simplified functional diagram of the transmitter of an improved TASI system;

Figure 1A:
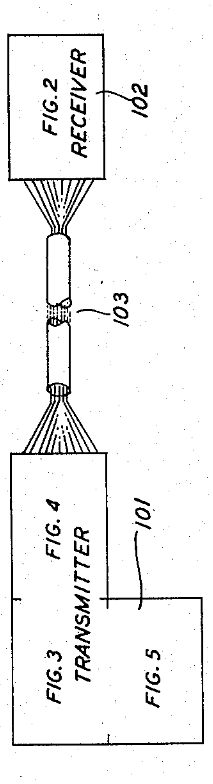
Figure 1C:
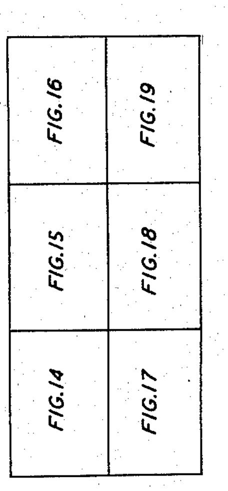
Figure 1B:
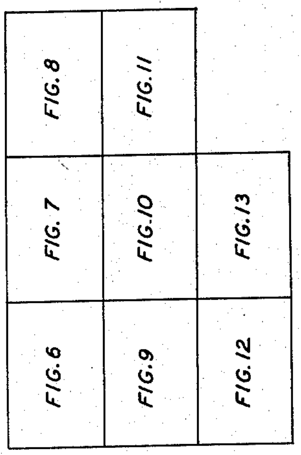

Referring more specifically to the drawings, Figs. 1–A, 1–B and 1–C show the inter-relationship of the composite figures of the drawings. In Fig. 1–A the time assignment speech interpolation transmitter 101 is coupled to the receiver 102 by means of the cable 103. The cable 103 represents an extended multichannel transmission facility which may extend for many hundreds of miles and may include a large number of amplifiers along its length. Fig. 1–B represents the arrangement of the sheets of drawings 6 through 13 which constitute the detailed block diagram of the TASI transmitter. Fig. 1–C is a similar showing of the arrangement of sheets 14 through 19 which constitute the receiver block diagram.

Concerning numerical cross references between the specification and drawings, it may be noted that the figure numbers are arranged to coincide with the sheet numbers for purposes of simplicity. In addition, the hundreds digit (or digits) of reference numerals indicates the sheet of the drawings on which the reference numeral first appears.

As discussed in the introduction, the object of a time assignment speech interpolation system is to save channel time by assigning channels to the talkers and listeners only when the talkers are actively engaged in talking or making a "spurt of speech." The connections between the talkers at the transmitter and the listeners at the receiver are effected through a universal access, time separation multiplex switching arrangement in which there is assigned one channel time slot for each speech channel which interconnects the transmitter and the receiver. Continuity of assignment of a channel to a particular talker-listener pair for the duration of a speechspurt is insured by memory units at both the transmitter and receiver which control the party-to-channel switching assignments.

Figure 2:
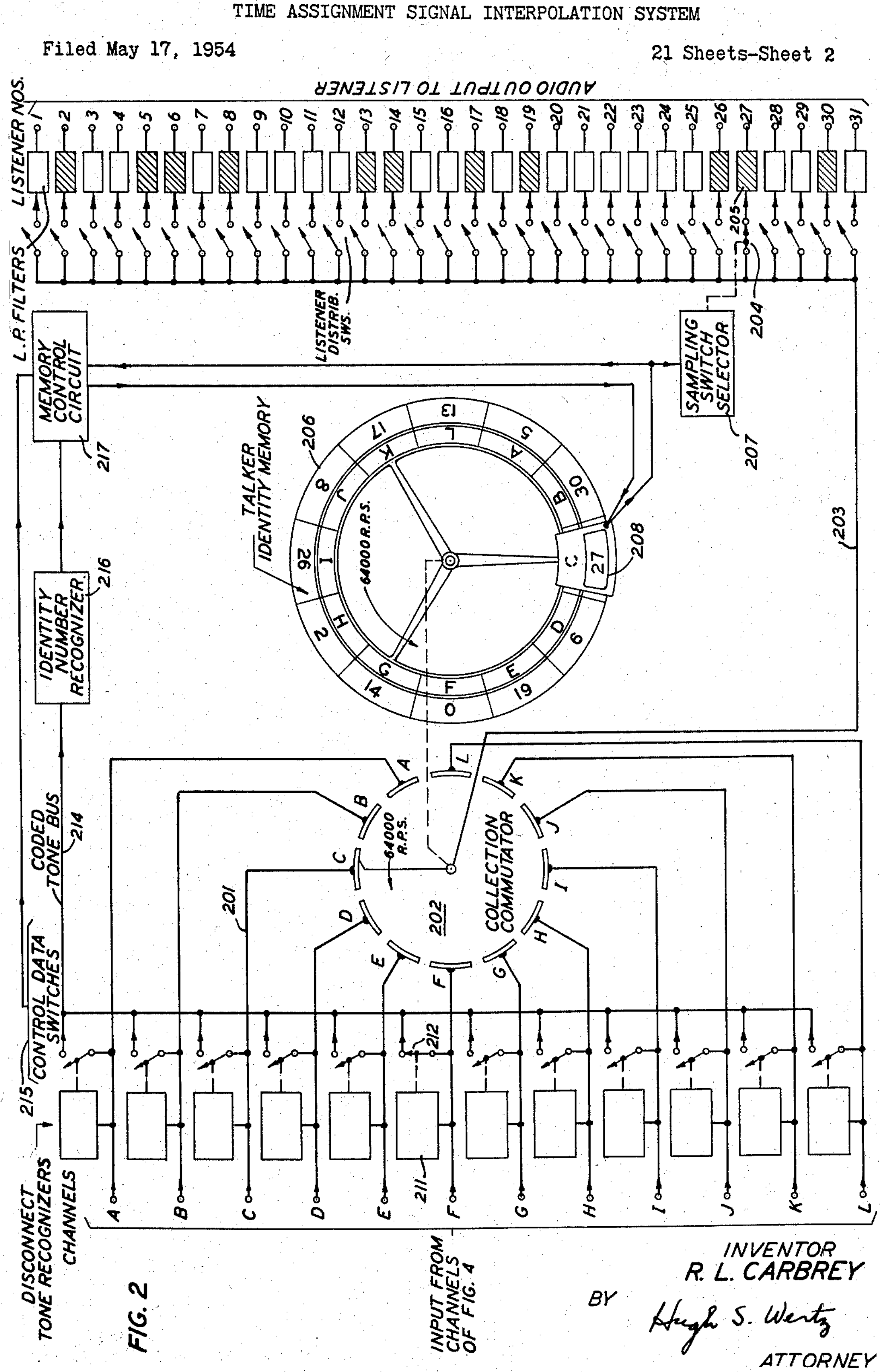

To facilitate the description of the present TASI system, the simple functional diagram of the receiver which appears in Fig. 2 will be discussed first. Fig. 2 shows, by way of example and for purposes of illustration, one possible disposition of the universal access switching arrangements and of the memory unit. Proceeding to a detailed description of this receiver circuit, the listener 27 is one of the listeners who is shown connected to the talker paired with him. In addition, at the instant shown in the figure a pulse sample of the transmitted signal is shown connected through to the listener 27. This "talkspurt" or spurt of speech, is transmitted between the transmitter (see Figs. 3 through 5) and the receiver through the audio channel C. In the receiver, channel C is coupled to listener 27 by way of the line 201, the collection commutator 202, the time separation multiplex bus 203, the switch 204 and the low pass filter 205 associated with listener 27. As soon as talker 27 stops talking, however, channel C may be disconnected from listener 27 and then listener 27 will not be reassigned to any channel until talker 27 starts talking again.

To accomplish the primary function of assigning available channels to parties in which the talker is active, the channels must be reassigned when the assigned talkers are inactive and when the channels are required for other active talkers. As illustrated in Fig. 2 by the shaded low pass filters, eleven of the 31 listeners are connected to eleven of the twelve channels, and channel F is available for a new assignment.

In the connection between a channel C and an "active" listener 27, the collection commutator 202, as switch 204 and a low pass filter 205 are included. As will be explained in detail hereinafter, the brush of the collection commutator 202 contacts commutator segment C at the same instant that switch 204 is closed, and a sample of the audio signal appearing at channel C is transmitted along the time separation multiplex bus 203 to a low pass filter 205. It is known that if this sampling rate is more than twice the highest frequency passed by the channel C and the low pass filter 205, no distortion will be produced. With the channel C and the low pass filter 205 passing up to about 3300 cycles of the audio band, a sampling rate greater than 6600 samples per second gives distortion-free operation. Other considerations which will be detailed hereinafter dictated the use of the somewhat higher rate of 64,000 revolutions per second for the brush of the collection commutator.

Continuity of channel-to-listener assignments during successive sampling cycles is assured by the talker identity memory wheel 206 which rotates in synchronism with the brush of the collection commutator 202. The sampling switch selector 207 reads the channel number 27 in the window 208, and closes the appropriate switch 204 permitting the passage of a sample of audio signal from channel C to low pass filter 205. The circulating memory unit 206 thus insures the synchronous gating of a particular listener (27) and a specific channel (C) for the duration of a talkspurt.

In addition to the connection to the collection commutator 202, a connection is made from each input channel to a disconnect tone recognizer associated with that channel. When an idle talker is to be disconnected from a channel, a disconnect signal is sent through the channel. This signal is a tone at the upper edge of the audio channel passband but beyond the cut-off frequency of the listeners' low pass filters, so that is will not be audible to the listener. When channel F, for example, is carrying a disconnect tone, the disconnect tone recognizer 211 closes the coded tone switch 212, which connects channel F to the coded tone bus 214. The control data switch (indicated at 215) for a given channel is first closed when that channel is to be disconnected from the listener, and this changes the talker identity number which was stored in the memory unit 206 for that particular channel to the disconnect identity number "0". This operation has disconnected channel F from the previous listener, and the zero in the talker identity memory 206 in the channel F position indicates that this channel is prepared to accept a new listener assignment. A new assignment always follows in the channel carrying the disconnect tone, and the multifrequency tone representing the new talker identity number is applied to the identity number recognizer 216. This circuit sets up the number in binary form and passes it on to the memory control circuit 217 which injects it into the disconnected channel (F) position in place of the "0" (disconnect) indication. The memory now has stored the new assignment number, and it can proceed to connect the identified listener to the appropriate input circuit once every revolution of the memory wheel.

Figure 3:
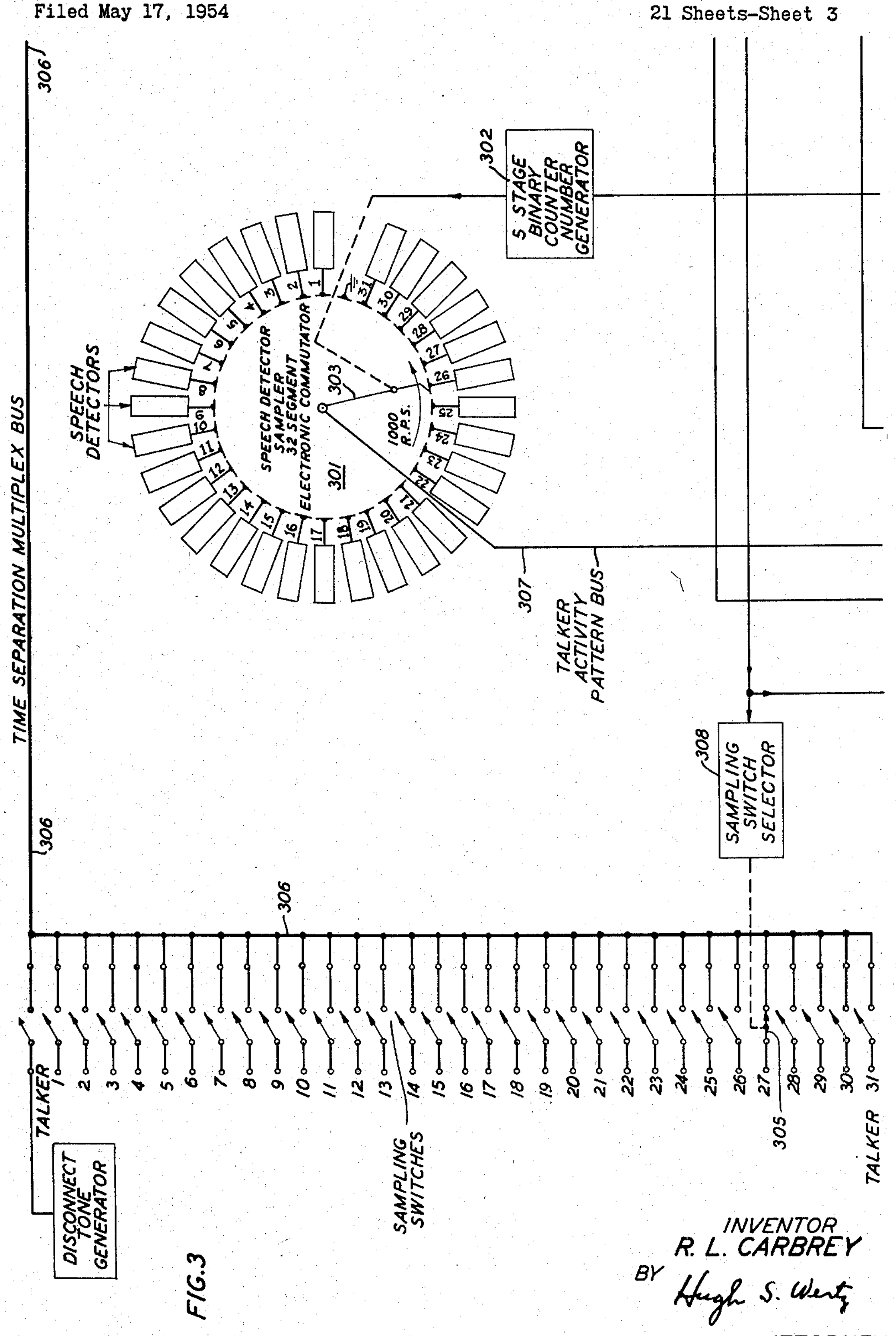
Figure 4:
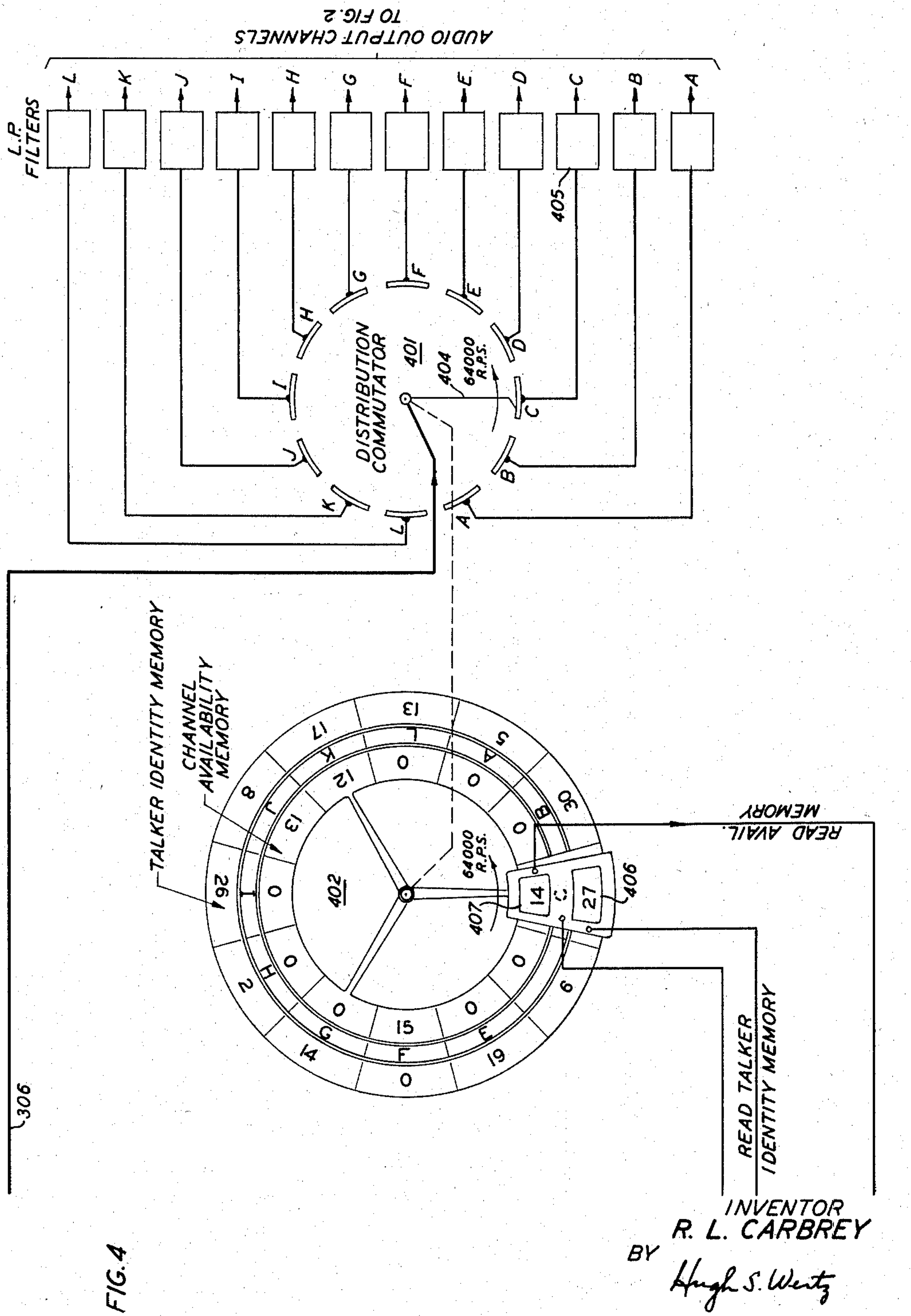
Figure 5:
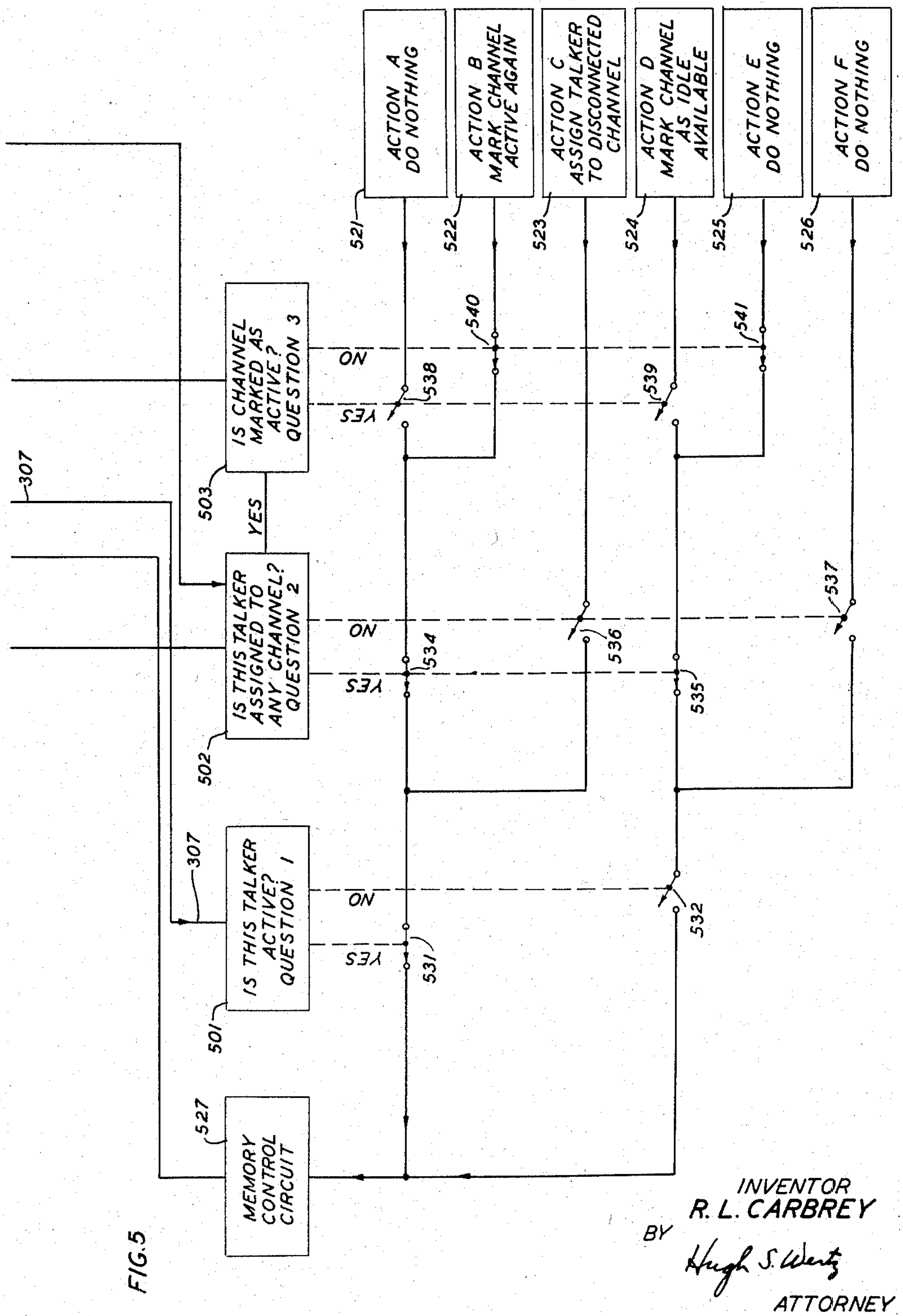
Figure 6:
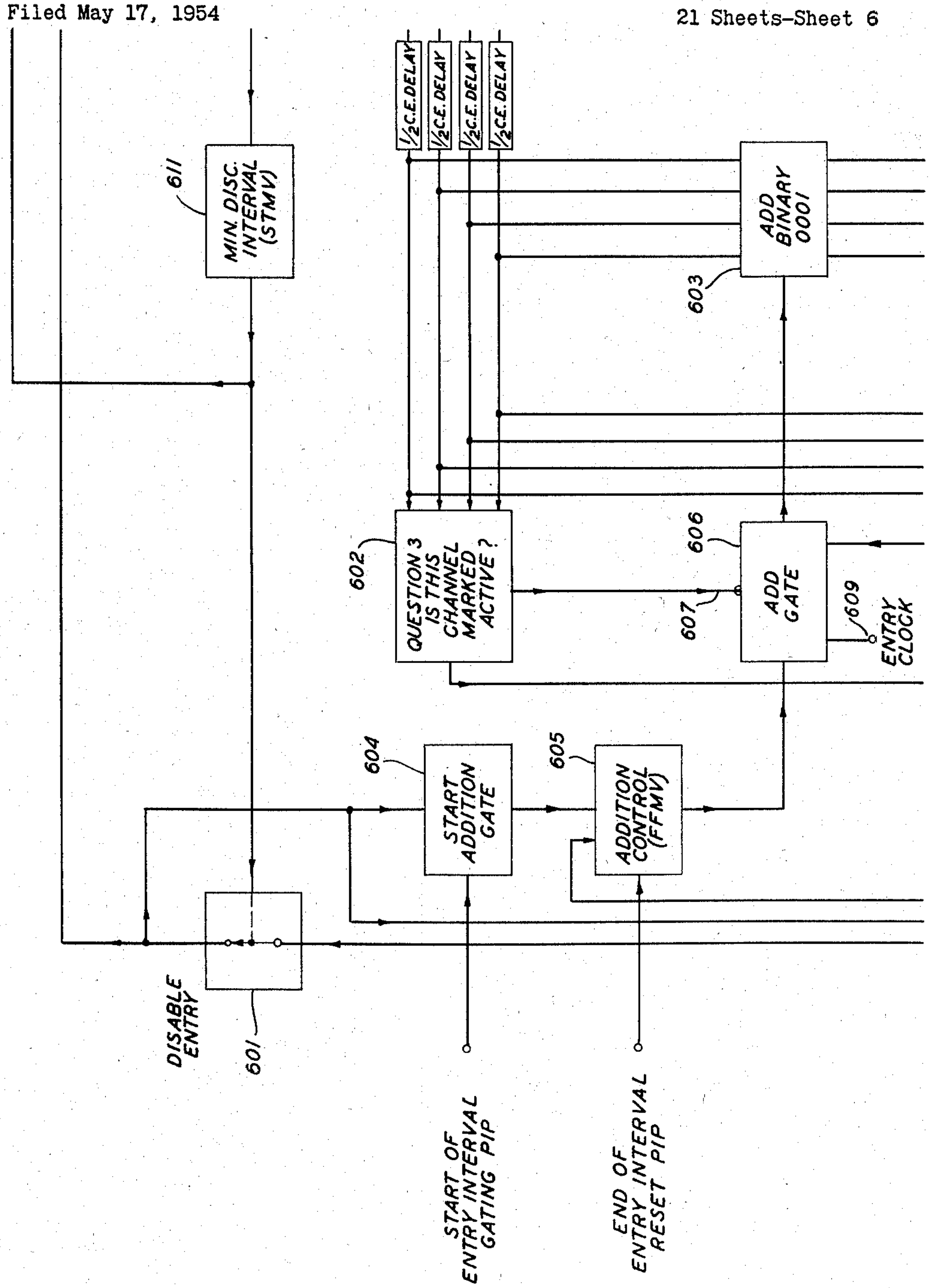
Figs. 6 through 13 illustrate a detailed block diagram of the transmitter of Figs. 3 through 5.
Figure 7:
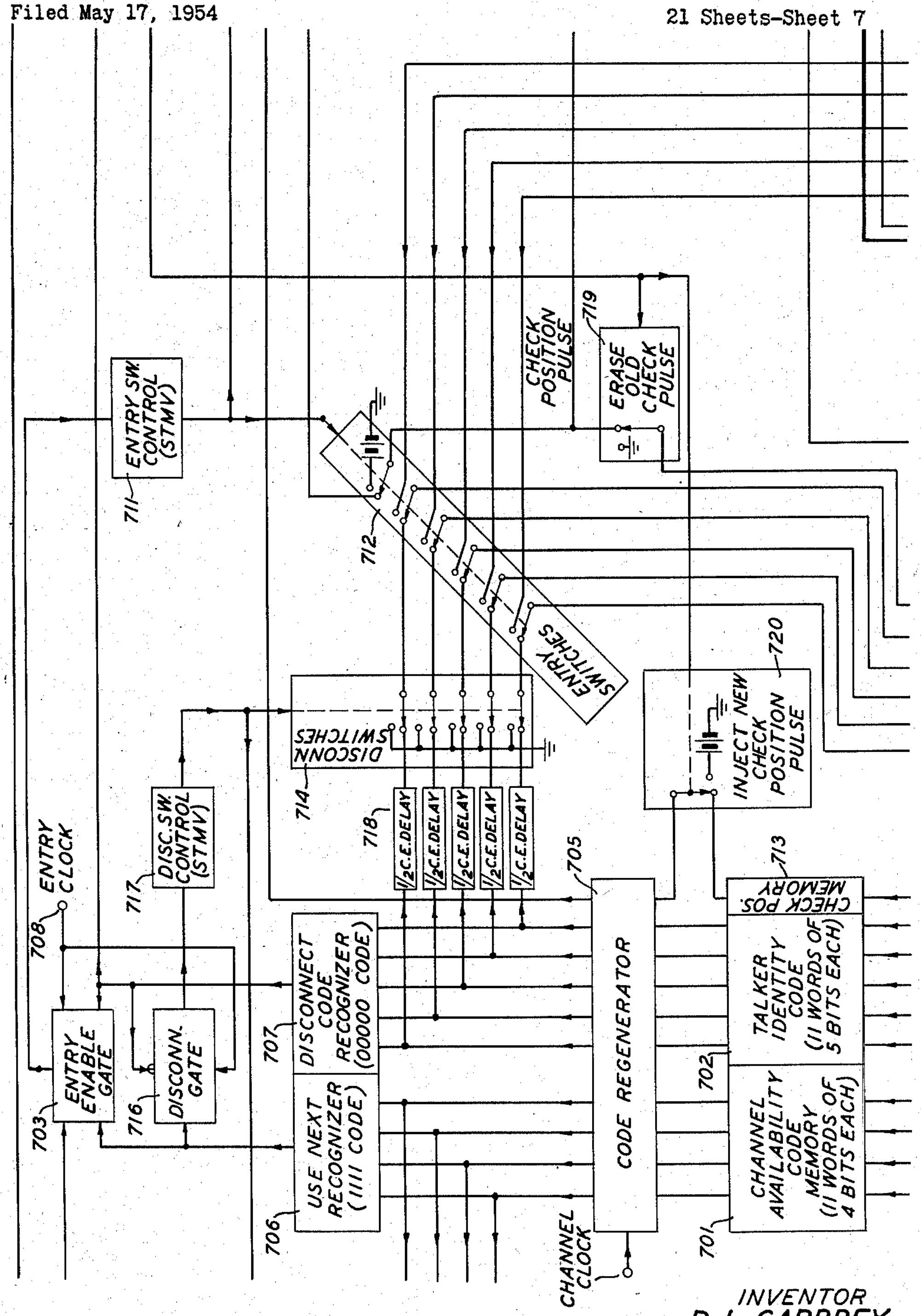
Figure 8:
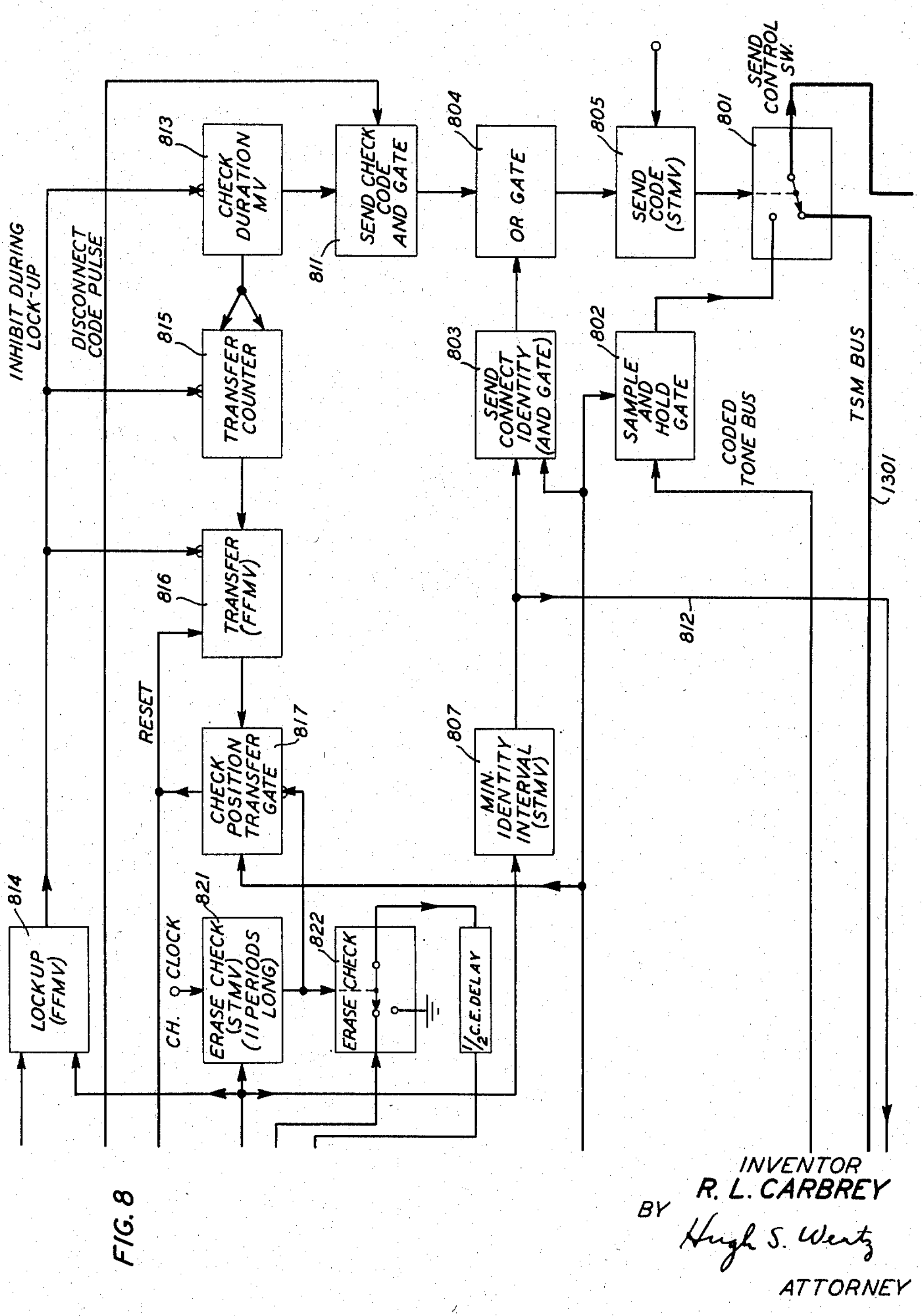
Figure 9:
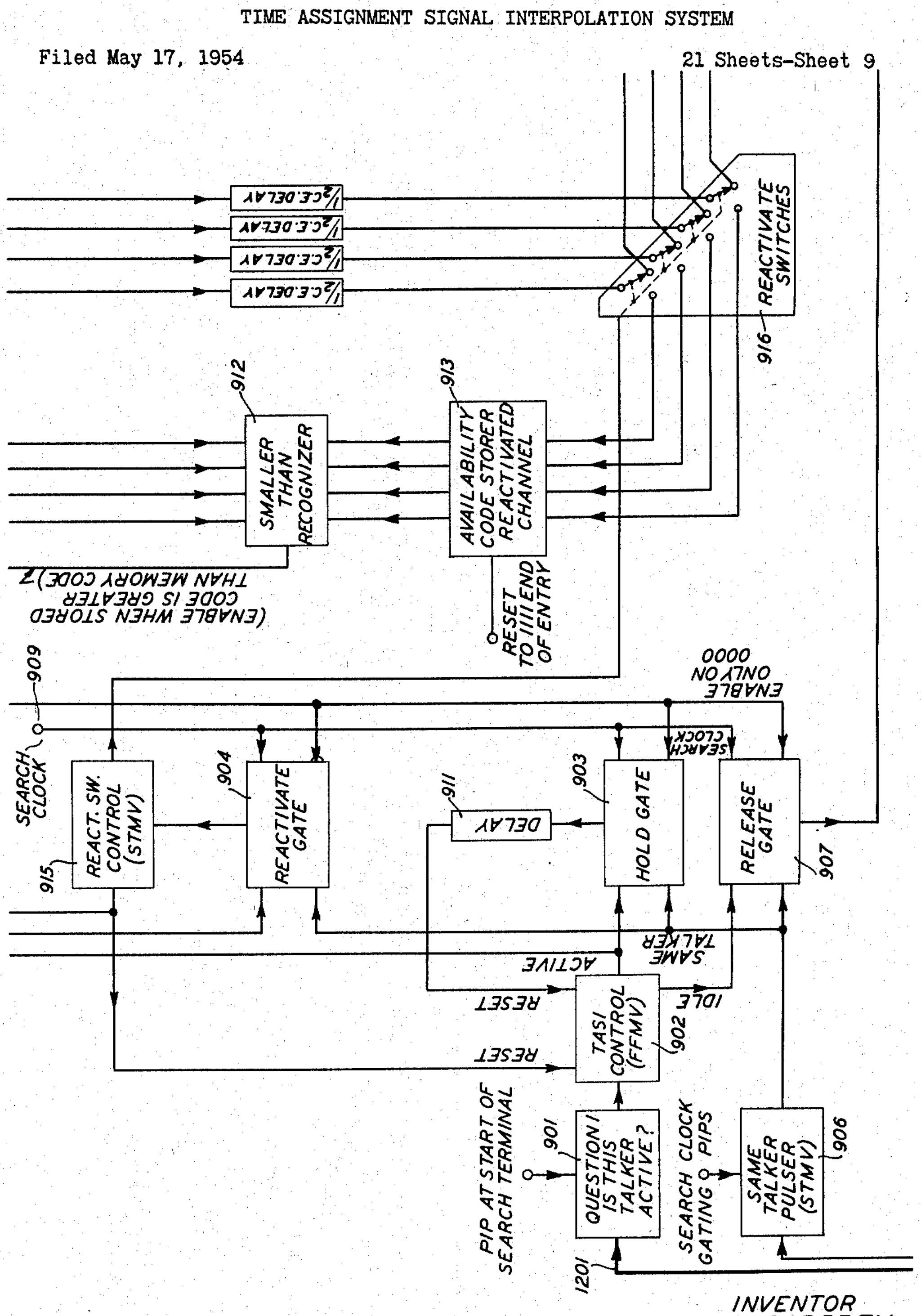
Figure 10:
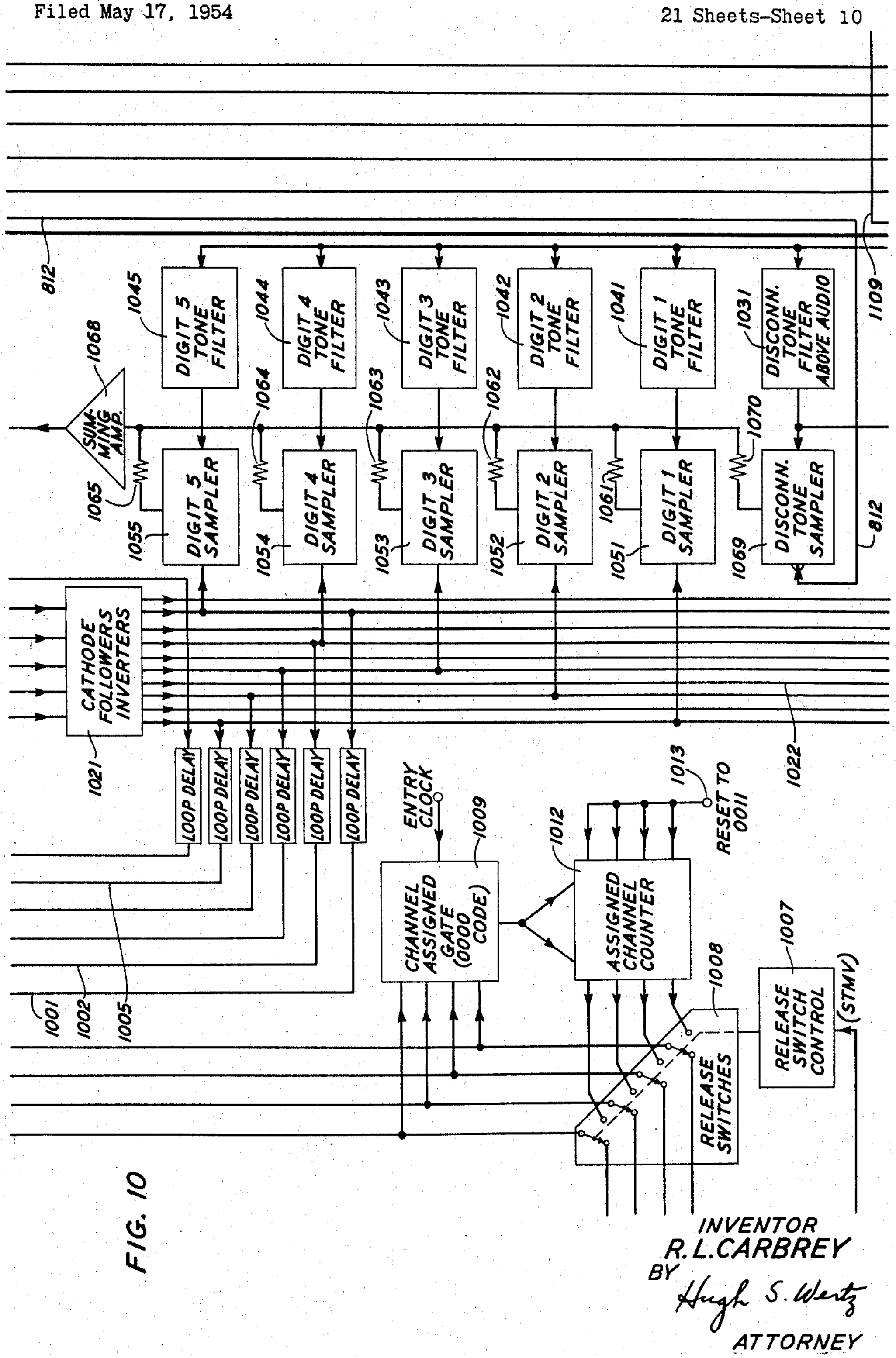
Figure 11:
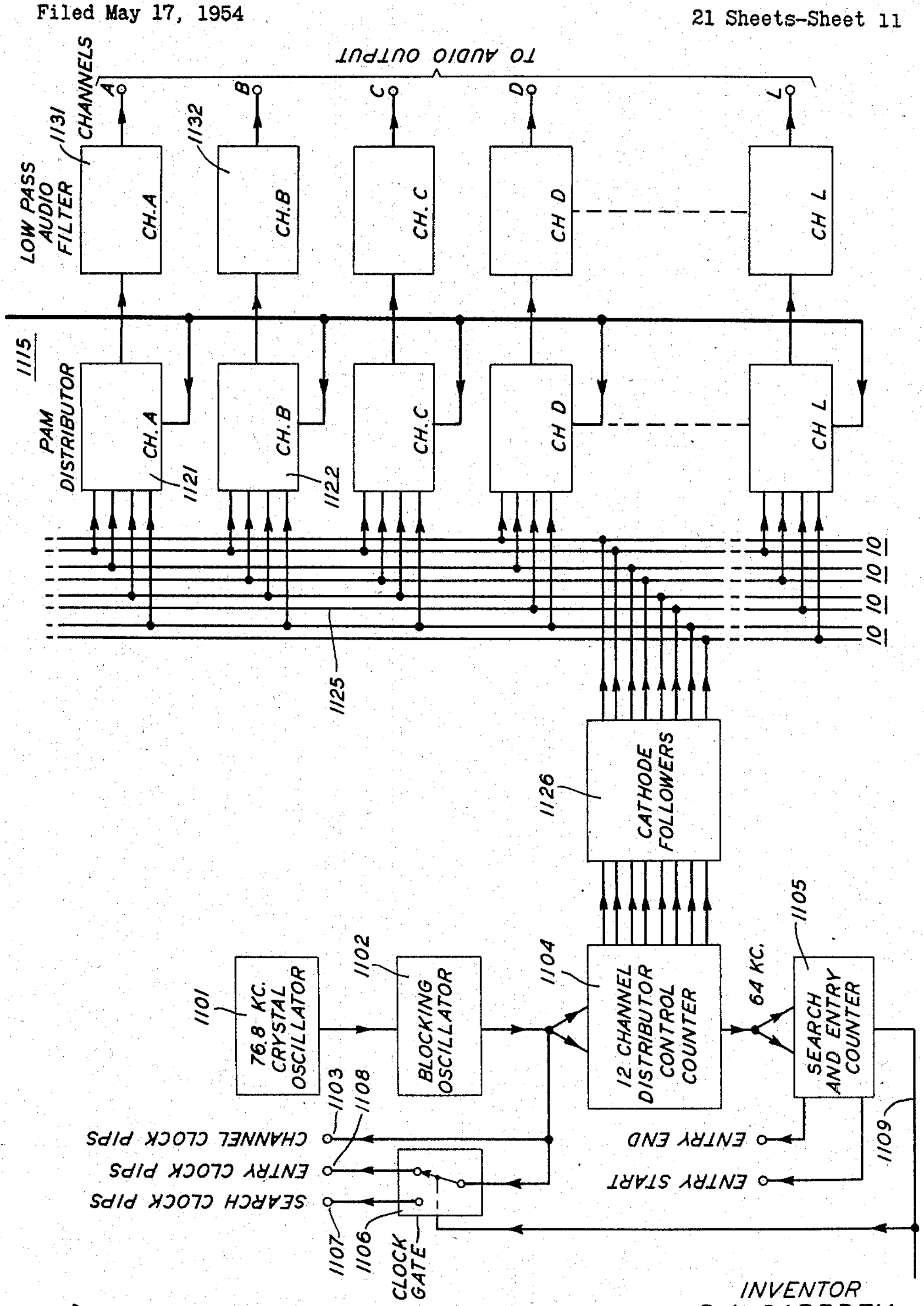
Figure 12:
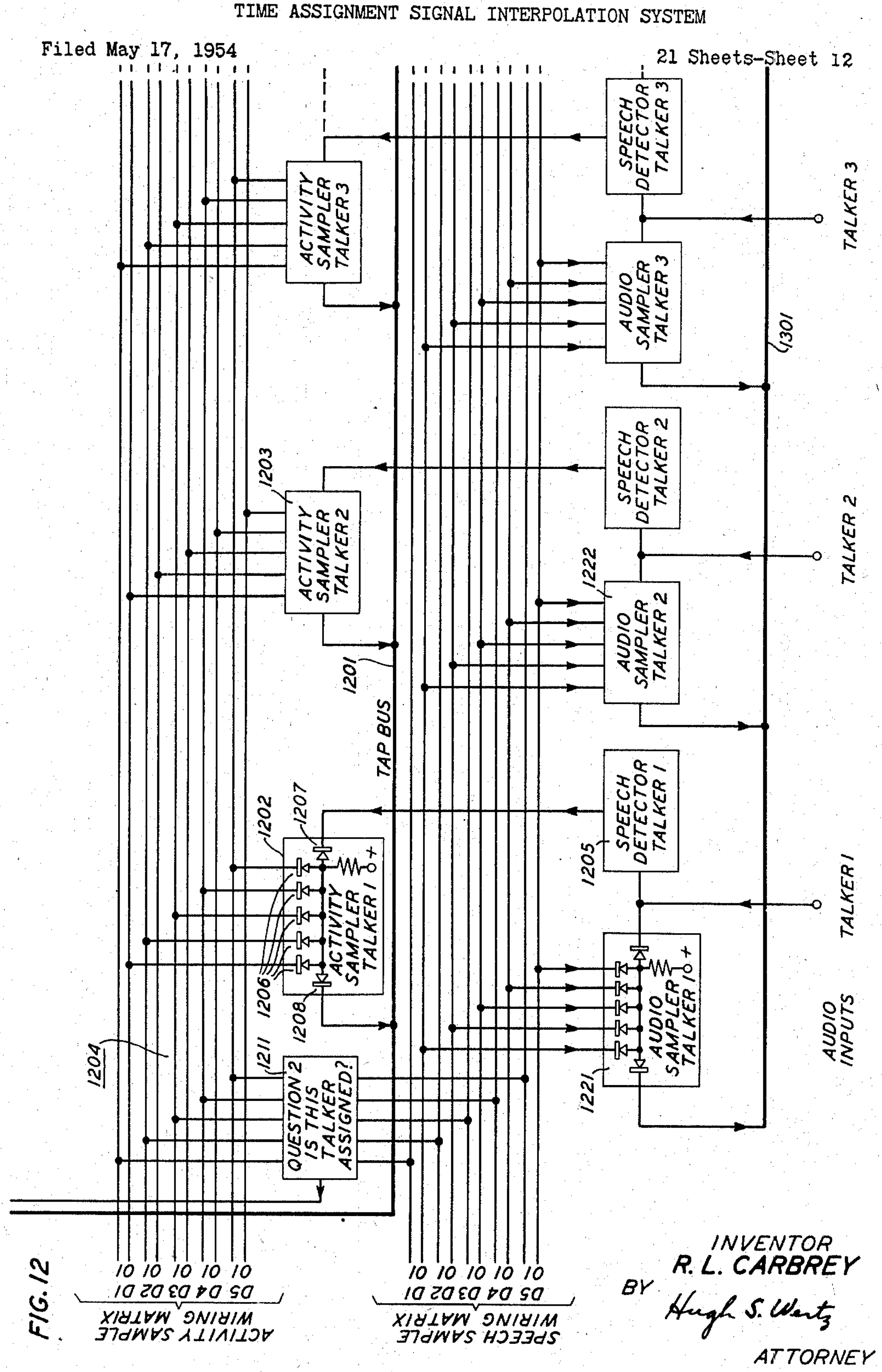
Figure 13:
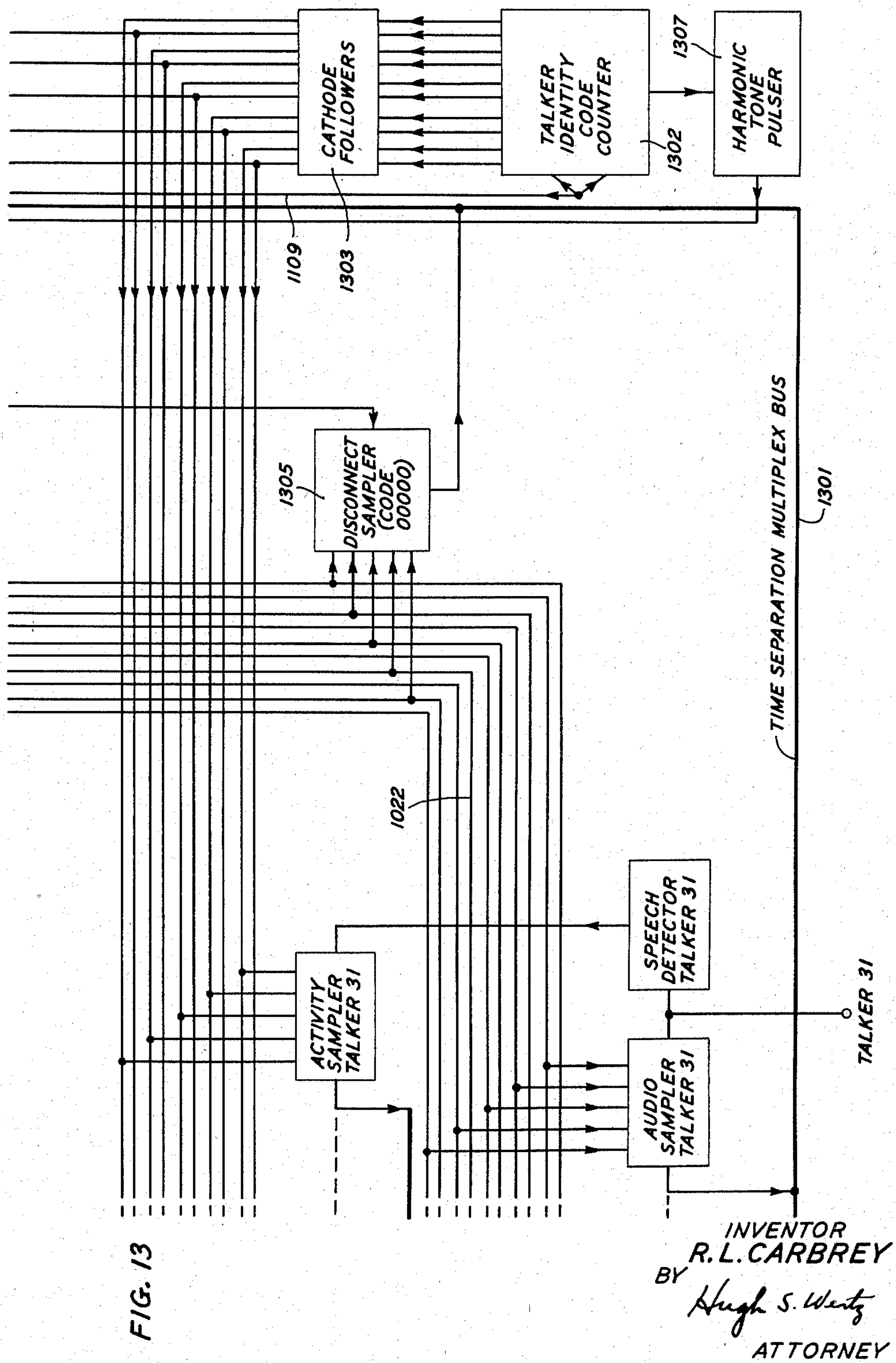
Figure 14:
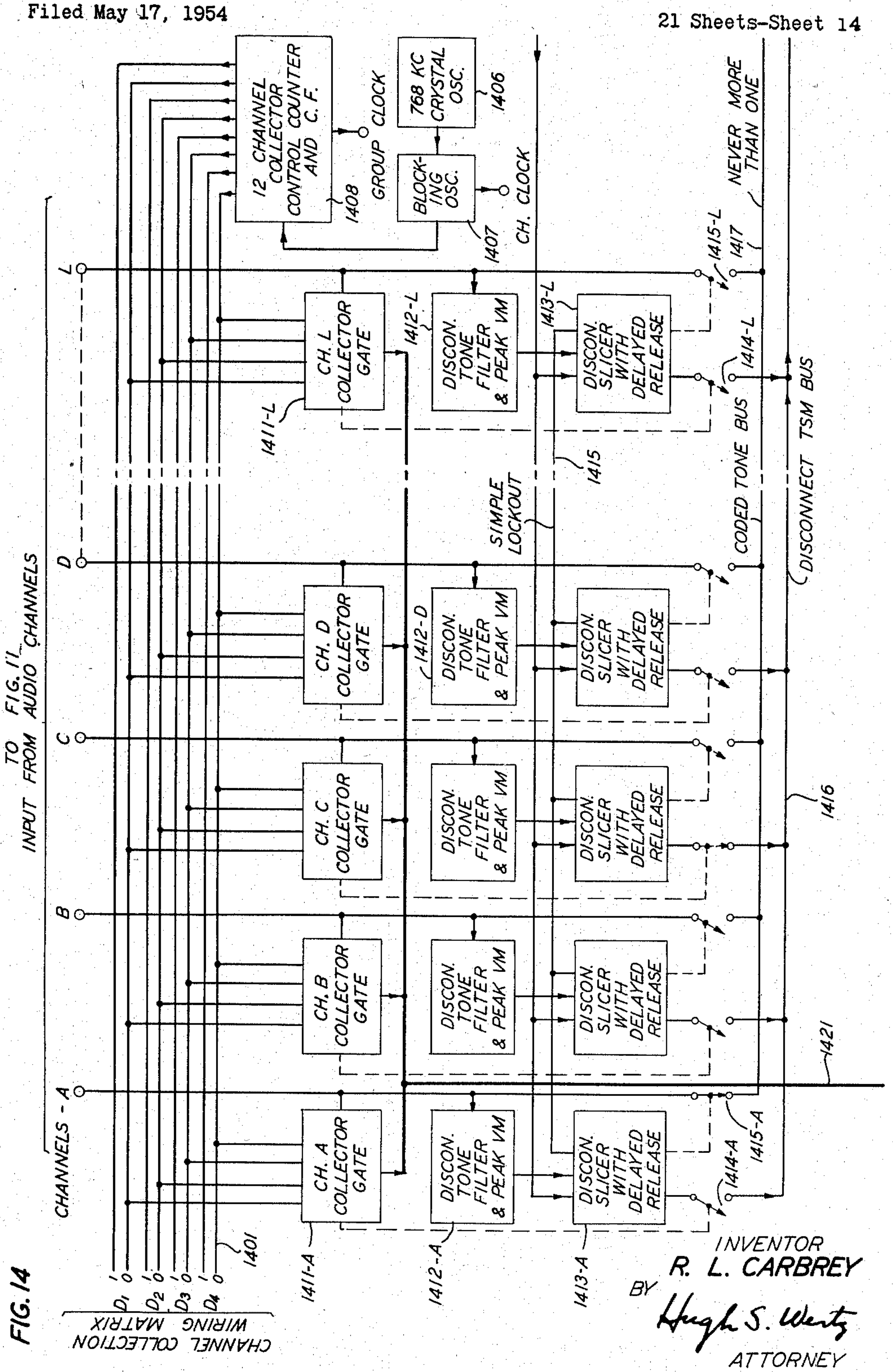
Figs. 14 through 19 represent a detailed block diagram of the receiver shown functionally in Fig. 2.
Figure 15:
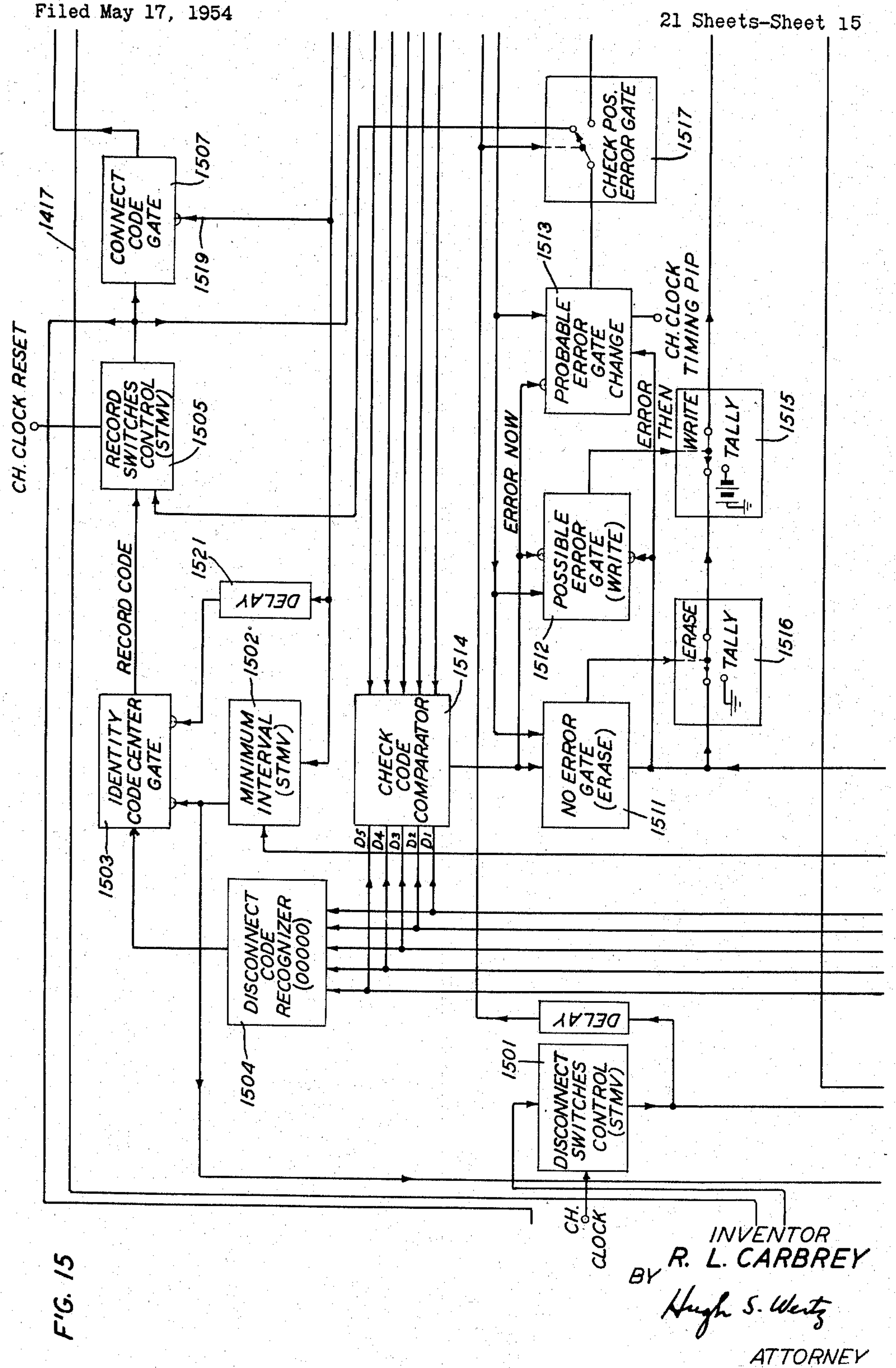
Figure 16:
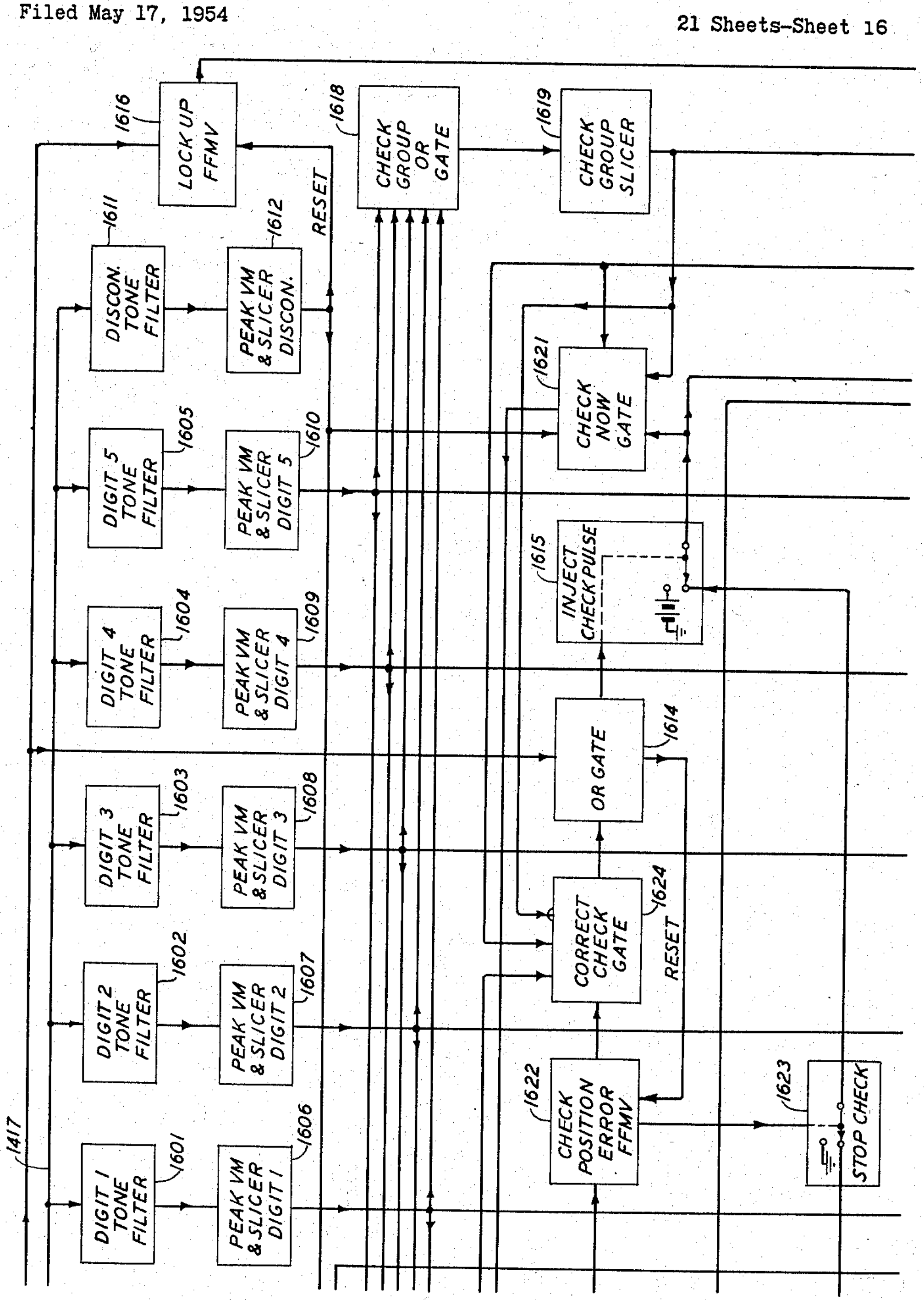
Figure 17:
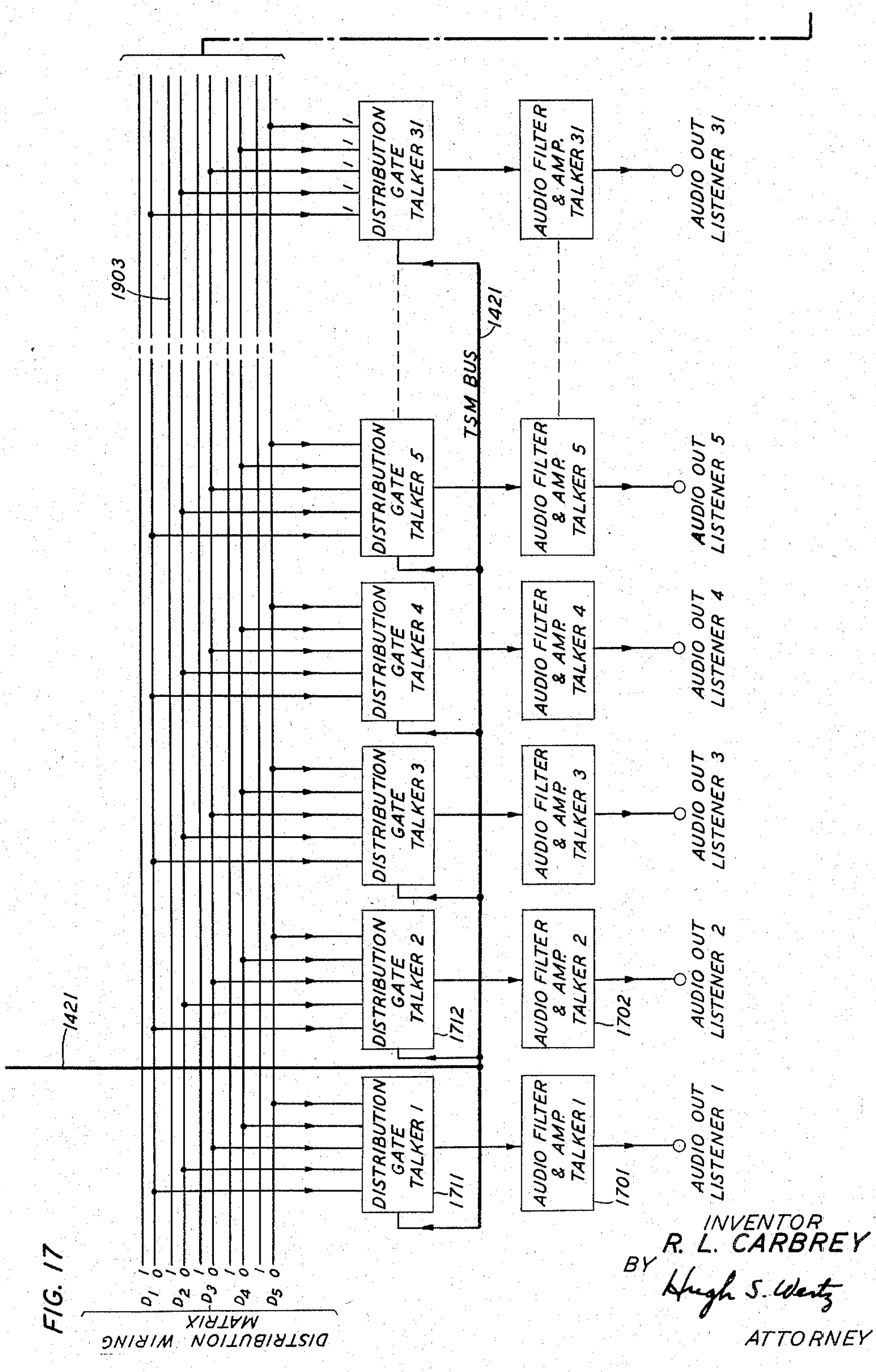
Figure 18:
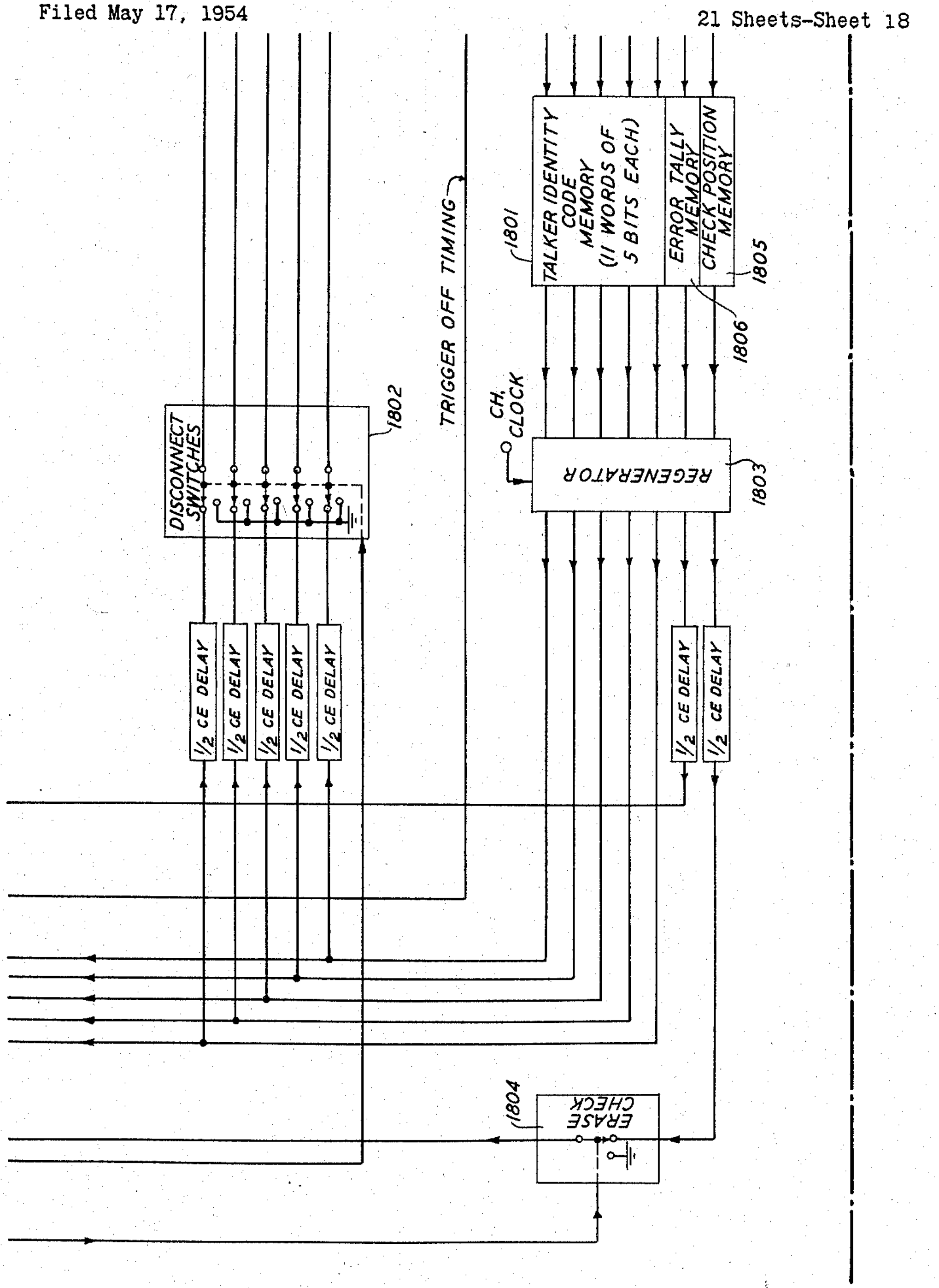
Figure 19:
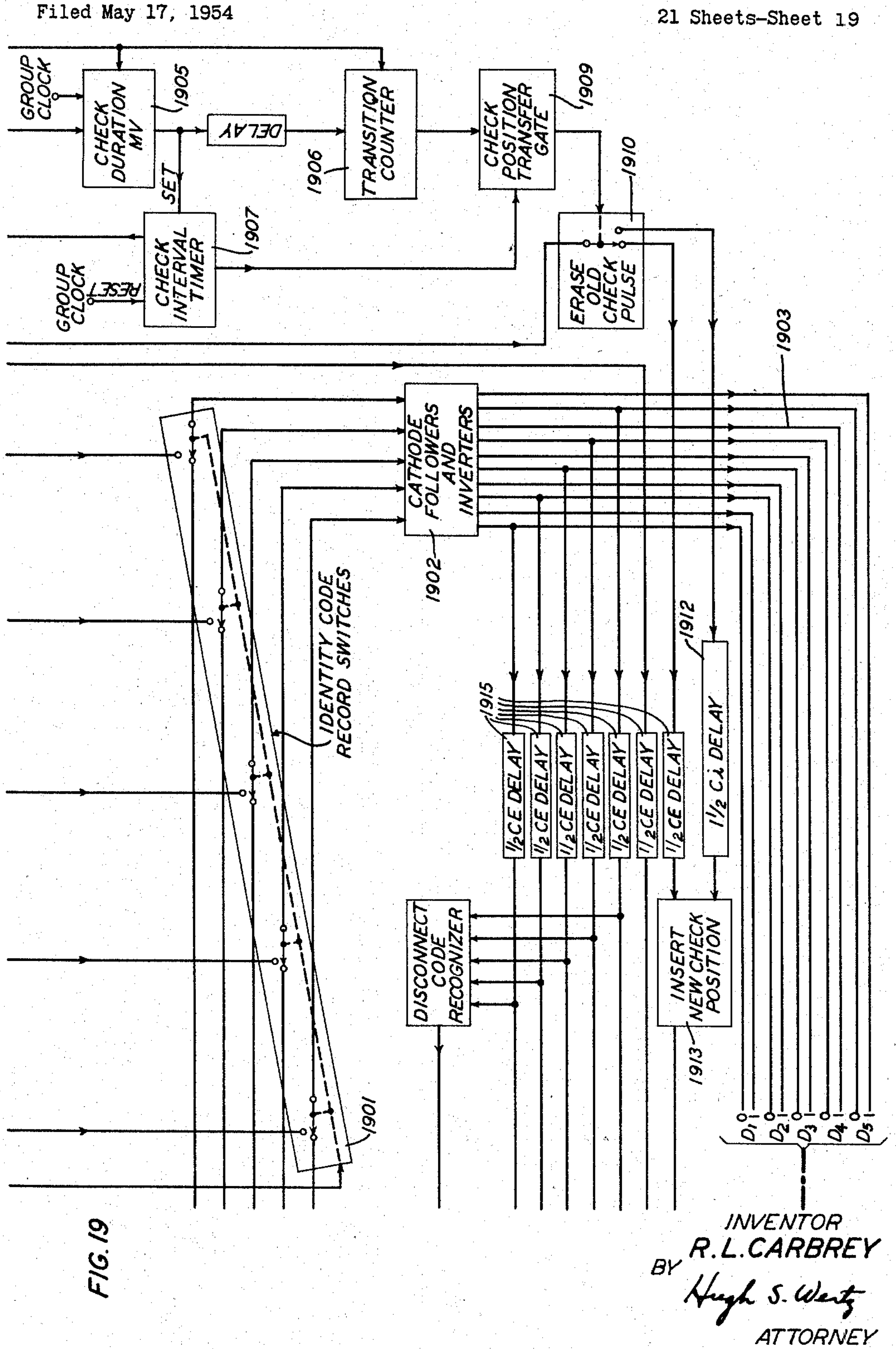

Figs. 3, 4 and 5 make up a single functional schematic diagram of the TASI transmitter which is to be used with the receiver of Fig. 2. Referring to Fig. 4 of this diagram, the distribution commutator 401 and the circulating memory unit 402 are comparable to but need not be synchronized with the collection commutator 202 and the memory unit 206 of the receiver. However, the talker identity information circulating in the two memory units is the same. Thus, when talker 27, for example, is coupled to channel C at the transmitter, listener 27 is simultaneously coupled to channel C at the receiver and a through connection is completed from talker to listener.

However, in addition to the operations which are carried on at both transmitter and receiver, the transmitter must perform many other logic operations in order to determine which talkers should be coupled to the available channels. The speech detector sampler 301 is useful in the performance of these additional functions. The control operation starts with the number generator 302. This unit 302 generates one after another in orderly sequence all of the numbers from zero through 32. As each number is generated it effectively drives the brush 303 of the speech detector sampler to the corresponding segment of the commutator as will be disclosed in detail in conjunction with the description of Figs. 6 through 13.

While the brush 303 dwells on a single segment of the commutator of the speech detector sampler 301, the memory unit 402 makes two complete revolutions. On the first of each of these two revolutions the condition of the memory is examined in conjunction with the activity of the talker on which the commutator brush 303 rests, and on the second of each of these two revolutions, appropriate changes in the talker identity memory and the channel availability memory are effected.

The connection from talker 27 to output channel C is by way of the switch 305, the time separation multiplex bus 306, the brush 404 of the distribution commutator 401, and then through the low pass filter 405 to channel C. The sampling switch selector 308 closes the proper talker switch (305) in accordance with the number (27) read at the talker identity reference window 406 of the circulating memory unit 402.

The logic operations which control the present time separation multiplex TASI will now be considered. These may be broken down into the three questions indicated by the legends in the "black boxes" 501, 502 and 503. The answers to the three questions are indicated by the closure of appropriate Yes or No switches associated with each of the black boxes. At the right on Fig. 5 of the drawings are shown six additional boxes 521 through 526 which represent the alternative actions to be taken by the memory control circuit 527 when the appropriate switches are closed to connect one of the boxes 521 through 526 to this memory control circuit 527. The memory control circuit 527 can insert or delete numbers from either the talker identity portion or the channel availability portion of the circulating memory unit 402.

In considering the logic operations it should be noted that a talker to whom a channel has been assigned retains that channel even after his spurt of speech, or "talkspurt" is ended, until the period of inactivity of that particular talker becomes the longest in the history of current assignments of any talker. The longest-idle talker's channel is then disconnected and held for assignment to any newly active talker. If, however, the talkspurts are renewed before the talker is disconnected the channel is reassigned to the same talker. This reactivation process minimizes the required control information which must be systematically transmitted from transmitter to receiver.

Another factor which is most useful in the understanding of the transmitter operation is the time relationship of the logic operations, the position of the speech detector brush 303, and the circulating memory unit 402. Note particularly that all of the questions in the boxes 501, 502 and 503 are answered, and the action indicated by one of boxes 521 through 526 is taken while the brush 303 is resting on a single commutator segment, and while the circulating memory unit is making two full revolutions.

The first question which is asked of box 501 is "Is this talker active?" This information is supplied by the talker activity pattern (or TAP) bus 307 which interconnects box 501 and the brush 303 of the speech detector sampler 301. If the answer is "Yes" it indicates that the talker under consideration (talker 27) is generating a talkspurt for which he will need a transmission channel. If the answer is "No" it indicates that the talker does not definitely require a channel for adequate service. A "Yes" answer to this first question closes switch 531 while a "No" closes switch 532. This question 1 is successively asked of all of the talkers in accordance with the number of the speech detector on which the brush 303 of the speech detector sampler 301 is resting.

Box 502 answers the second question "Is this talker assigned to any channel?" If the answer is "Yes" it indicates that the talker under consideration has been assigned to one of the 12 channels by some previous operation. If the answer is "No" it indicates that the talker is not assigned to any one of the 12 channels. These answers close associated pairs of switches 534 and 535 (for "Yes" answers) and 536 and 537 (for "No" answers).

The third question is as follows: "Is the channel (to which the talker is assigned) marked as active?" An affirmative answer is normally indicated by the presence of a "0" in the channel availability memory. If the answer is a "Yes" it indicates that this talker was deemed to be active the last time the circulating memory was read at the window 407 of the memory unit 402. As long as this marking (0) exists the channel cannot be taken by any other talker. If the answer is "No" it indicates that this talker was considered to be idle the last time and that the channel has been put in the line of channels available for use by some active talker who is not assigned to a channel. This "No" answer is indicated by the presence of a number other than zero at the window 407 associated with the channel availability memory. For convenience in handling the binary numbers which are involved, the longest-idle channel is marked 15 and other idle channels have progressively lower numbers. A "Yes" answer to question 3 closes a pair of switches 538 and 539. A "No" answer, however, closes switches 540 and 541.

Various combinations of answers to the three questions will now be considered, and the action required by these answers will be studied. There are six combinations of answers to the three questions which require consideration, and the particular action required is indicated in actions A through F which appear as legends in boxes 521 through 526, respectively. First, we will consider the case where all three answers are "Yes." Action box 521 will then be connected to the memory control circuit 527 by switches 531, 534 and 538. These answers mean (1) that the talker is talking, (2) that he has a channel to talk over, and (3) that the channel is marked active to prevent its assignment to another talker. This channel is actively assigned. Therefore, no change needs to be made, and action A simply indicates that no action is required.

A second possible combination of answers is (1) "Yes," (2) "Yes" and (3) "No," causing switches 531, 534 and 540 to close (as indicated on the diagram) and connecting action box 522 to the memory control circuit. These answers mean (1) that the talker is talking, (2) that he has a channel to talk over, but (3) that the channel was marked previously as available to any newly active talker on demand. Serious unwanted clipping of the talker's speechspurt would occur if the talker were disconnected from the channel during the talkspurt. Therefore, the action which must be taken by box 522 is to "mark the channel 'active' again." In this action the channel is taken out of the list of available (but still assigned) channels in the channel availability section of the circulating memory 402, and is identified (by a "0") as a channel which cannot be disconnected until the talker once again becomes idle. When this happens the channel will again be put at the end of the line of available channels by action D as indicated at box 524.

A third possible combination of answers is (1) "Yes" and (2) "No." This closes switches 531 and 536, which connect action box 523 to the memory control circuit 527. These two answers indicate (1) that the talker is talking and (2) that he does not have a channel to talk over. Since he does not have a channel, question 3 ("Is channel marked as active?") is meaningless and need not be asked. Obviously, the talker needs a channel; so action C is: "Assign talker to disconnected channel." Whenever there are fewer talkers actually generating talkspurts than there are transmission channels, at least one of the channels is not in active service. Out of the group of idle channels which are still assigned to a particular talker, that one which has been in idle service longest (as indicated by the number 15 in the channel availability memory) is disconnected as soon as the channel which had been previously disconnected is assigned to some newly active talker.

Thus, except for the rare instances when the number of active talkers is equal to or exceeds the number of channels, one channel is always held disconnected and ready for assignment to any talker who may need service. This disconnect operation is a subsidiary function of actions C and D.

Action D, as indicated by box 524, is connected to the memory control circuit 527 when the answers to questions 1, 2 and 3 are "No," "Yes," and "Yes," respectively. This combination of answers closes switches 532, 535 and 539. Under these circumstances, (1) the talker is not talking, but (2) he has a channel connecting him to a listener and (3) the channel is marked as if he were actually talking. Accordingly, action D must then be: "Mark channel as having an idle talker, and as available." During the first rotation of the circulating memory unit 402, the channel availability code for the talker in question is found to be marked with the active, or "0," code, and during the second rotation a number indicating the position of the channel in the group of idle channels is substituted for the active indication. Instead of disconnecting the channel as soon as a talkspurt is over, this system permits the connection to remain until the channel is actually needed by some other talker. In the case of light loads this permits the talker to remain connected for long periods and, even in heavy loads, it permits the talker to hold the circuit with fewer voice-enabled connections.

A fifth combination of answers is "No," "Yes," and "No." Under these circumstances, switches 532, 535 and 541 are operated to connect box 525 to the memory control circuit 527. This combination of answers indicates that, although the talker is not active, he has a channel for whatever signals do exist and that this channel has been put in the line of channels awaiting assignment to a newly active talker. This is a situation which was established by action D for inactive but assigned talkers. Inasmuch as there is no reason to disturb this condition, action E is simply "Do nothing."

The sixth and final combination which must be considered is the result of a "No" answer to both questions 1 and 2. It closes switches 532 and 537 thus connecting action F as indicated by box 526 to the memory control circuit 527. These two answers indicate that the talker is not talking and that he does not have a channel. Since the talker does not need a channel, no action need be taken, and therefore action F is also a simple "Do nothing."

The foregoing six combinations of answers represent the basic logic operations of the TASI transmitter with time separation multiplex switching. A number of subsidiary operations must be performed in order to obtain the desired actions and to establish the proper routine and method of asking the questions and notifying the receiver of any changes which would affect it. These operations will be discussed in detail in connection with the complete schematic diagrams of Figs. 6 through 13.

In the functional block diagrams of the receiver and the transmitter which appear in Figs. 2 through 4, and which have been discussed above, several switching devices are shown as commutators. These commutators merely illustrate the function of electronic switches which will be described in some detail hereinafter, and the legends "64,000 R.P.S." associated with commutators 202 and 401, for example, merely indicate the timing of the electronic switches.

The detailed block drawing of the TASI transmitter is presented on sheets 6 through 13 of the drawings, which must be arranged as shown in Fig. 1–B to form a coherent circuit. The general conformity of the detailed schematic circuit to the simplified functional circuit of Figs. 3, 4 and 5 will now be established. The input talker lines which appear to the left of Fig. 3 in the simplified circuit, are found along the lower border of Figs. 12 and 13 in the detailed schematic circuit. Similarly, the output channels A through L of Fig. 4 are found to the right in Fig. 11 of the detailed schematic. The time separation multiplex bus 306 of the simplified circuit finds its equivalent in the T.S.M. bus 1301 which appears, of course, in Fig. 13, and which also interconnects the 31 talkers and the 12 channels. The talker activity pattern bus 307, which interconnects the speech detector sampler 301 and the question 1 box 501, is shown in the detailed schematic by the TAP bus 1201 which is also connected to the question 1 box 901. In addition, the memory units 701 and 702 and their associated output loops correspond to the inner and outer portions of the memory unit 402 in the simplified circuit.

Now that the correspondence between a few of the key components of the two transmitter circuits has been established, the block schematic diagram of Figs. 6 through 13 will be considered in detail. In time separation multiplex systems, almost all of the operations are synchronous, and their order and duration are determined by timing sequences. Accordingly, it is logical and appropriate to start the system description at the source of fundamental frequency. The 768 kilocycle crystal oscillator 1101 initiates the timing function and controls the timed operation of the entire system. Coupled to the oscillator 1101 is the blocking oscillator which generates channel clock pips at 1.3 microsecond intervals. These channel clock pips, which appear on lead 1103, are employed at many points throughout the balance of the transmitter circuit. The 12-channel distributor control counter 1104 is also coupled to the output of the blocking oscillator 1102 and is advanced one count at a time by the channel clock pips. The distributor control counter 1104 controls the actuation of the 12 output channels A through L, and is therefore reset to 0 after each count of 12. Hence, it divides the 768 kilocycle output from the blocking oscillator 1102 down to 64 kilocycles, and completes a count every 15.6 microseconds.

Search and entry counter 1105 is a single stage counter which sorts alternate 15.6 microsecond intervals into "Search Intervals" and "Entry Intervals." This counter operates clock gate 1106 to cause alternate groups of 12-channel clock pips to be gated first to the search clock output terminal 1107, and then to the entry clock output terminal 1108. These 15.6 microsecond search and entry intervals when taken together comprise a 31.2 microsecond interval termed the "talker interval" because this is the total length of time devoted by the assignment mechanism to a particular talker. This talker interval corresponds to the length of time the brush 303 of the speech detector sampler 301 dwells on the commutator segment of any one talker's speech detector. During the search interval the system hunts through the list of assigned talkers to determine whether or not the talker under consideration has been assigned. During the entry interval the talker is assigned to a channel if one is needed. Search and entry counter 1105 drives the talker identity code counter 1302 through the circuit 1109. The talker identity code counter 1302 is a 5-stage binary counter which serves as a number generator for all of the talker numbers from 0 through 31. It is used as a source of coded numbers when one is needed to identify the talker currently under consideration and it also serves to operate the activity samplers 1202, 1203, etc., which are connected to the activity sample wiring matrix 1204.

The speech detector sampling circuit is made up of a group of 32 varistor gates 1202, 1203, etc., termed "activity samplers," each of which is turned on in turn by the coded output from the talker identity code counter. The varistor gates 1202, 1203, etc., are of the type disclosed in L. A. Meacham Patent 2,576,026 granted November 20, 1951. Considering the activity sampler 1202, a connection is made from the speech detector 1205 of talker 1 through the activity sampler 1202 to the talker activity pattern bus 1201 when all of the varistors 1206 which couple the activity sampler 1202 with the wiring matrix 1204, have positive pulses applied thereto. When this condition exists the input diode 1207 and the output diode 1208 of the activity sampler 1202 are driven into their low resistance condition and a sample of the condition of the speech detector 1205 is applied to the talker activity pattern bus 1201. The activity sampler wiring matrix 1204 is made up of five pairs of wires. Each of these pairs of wires represents a binary digit and each binary digit on a pair of wires is indicated by a positive voltage on one of the two wires and a negative voltage on the other of the two wires. These signals are generated by the talker identity code counter 1302 and are applied to the wiring matrix by the cathode followers 1303. It may be noted that each of the sets of leads from the various activity samplers 1202, 1203, etc., is connected in a different manner to the activity sample wiring matrix so that each one is actuated successively.

As indicated hereinabove the basic logic operations of the TASI transmitter can be established by three questions which can have simple "Yes" or "No" answers. These three questions are:

Question 1: Is this talker active?
Question 2: Is this talker assigned to a channel?
Question 3: Is this channel (to which the talker is assigned) marked as "active"?

The answer to the first question is obtained by taking a sample of the talkers speech detector, and applying it to the question 1 box 901 by way of the talker activity pattern bus 1201. The question 1 box 901 is an on-off device which changes state at a predetermined input level, and is termed a "slicer." When the sampled speech detector is in the "On" state, a pulse is obtained as a sample. This pulse is regenerated by the question 1 slicer and a narrow gating pip at the very start of the search interval to insure the continuity of the answer to question 1 during a single talker interval, despite possible changes in the condition of the speech detector. An output pulse from the question 1 box 901 causes the TASI control bistable multivibrator 902 to be set to the "active" state. If there is no output from the question 1 box 901, indicating an inactive talker, the TASI control bistable multivibrator remains in the idle state. This answers the first of our three questions. The method of obtaining the answers to questions 2 and 3 will be developed hereinafter.

In order to explain the operation of the transmitter, one of each of the normal operating sequences will be described. First, it is assumed that the talker has just become active, that there is a channel available and that he has not had a channel before. When talker identity code counter 1302 advances to the code of this talker, activity sampler 1202 (for example) operates and a pulse is applied to talker activity pattern bus 1201. This pulse is regenerated at the start of the search interval by the question 1 slicer 901. The output then flips TASI control flip-flop multivibrator 902 to the active state. This partially enables hold gate 903 and reactive gate 904 by way of disable entry switch 601. In addition the pulse passes through disable entry switch 601 to entry enable gate 703, thus providing one of the four inputs to this latter gate 703 which are necessary for assignment of the talker to a channel position. Two of the other required inputs to entry enable gate 703 are derived from the circulating memory circuits which include the storage units 701 and 702. These circulating memory circuits must provide three types of information for the transmitter logic operations. The internal part of talker identity code memory unit 702 consists of 11 words of five "bits" each. The five "bits," or binary digits, are pulses on circuits 1001 through 1005 and the 11 words represent the storage capacity of the circulating memory unit 702. This memory circulates the assigned talker identity codes, and thereby causes audio samples to be taken of the speech of the assigned talkers in the order of appearance of the codes in the memory output in a manner to be described hereinafter. The codes are standardized by code regenerator 705 at each appearance at the memory output. They are then routed to the appropriate logic circuits and back to the input of the memory unit 702. The twelfth memory element is the delay and storage in the output portion of the memory loop.

A second memory loop with a storage unit 701 having an internal capacity of 11 four-bit words and an output capacity of 1 four-bit word is used to record the channel availability data. The information which determines the order of assignment of the channels is stored in this memory loop. Each time a talkspurt ceases, thus freeing a channel from the active assignment, a binary code is written into the channel availability memory 701 designating the number of inactive channels then available. This puts the channel in the queue of channels awaiting assignment. Each time an assignment is made the number in the channel memory slot is advanced by one. Eventually this channel comes to the head of the line and becomes the one which is to be assigned next. When this happens the "use next" recognizer 706 is operated and produces a second input to the entry enable gate 703. If a disconnect tone has been set out for this channel the binary code 00000 is circulating in the talker identity code memory 702 and this code operates the disconnect code recognizer 707 to produce a third enabling pulse to the entry enable gate 703. The conditions are now established for an entry assignment and this starts to take place at the instant the entry clock pip at terminal 708 is applied to the entry enable gate 703. As mentioned hereinbefore in connection with terminal 1108 the entry clock pips comprise a sequence of 12 short pulses, one channel slot apart, which are obtained by gating the output of blocking oscillator 1102 through clock gate 1106 during the 15.6 microsecond entry interval. These entry clock pips are used for standardizing all operations which can take place only during the entry interval at one or more of the channel positions. The one of these entry clock pips which appears when the other three inputs to the entry enable gate 703 are in the enabling condition, is gated through to trigger entry switch control 711. This control 711 in turn transfers entry switches 712 to the "write" position for one channel slot interval. As a result the code of the talker under consideration is passed from the talker identity code counter 1302 into the talker identity portion of the circulating memory. When entry switches 712 are operated to assign a new talker they also inject a pulse into the output loop of the check position memory unit 713. The manner in which this operates to cause the newly assigned talker's identification code to be sent to the receiver will be described hereinafter. Once an identification code has been written into the talker identity memory it serves the dual purpose of causing samples of the newly assigned talker's audio signal to be taken and of continuing its identification in the memory for as long as necessary by providing an appropriate answer to question 2 (Is this talker assigned to any channel?). The steps which are required to assure a continuation of the identity codes, both during the sending of the identification to the receiver and the sending of samples, will now be considered. This condition is one in which a talker is active and is also actively assigned to a channel. The operation starts back at the TASI control multivibrator 902 which is set to the active state because the talker being considered is active during the periods when his speech detector is sampled. This provides one of the four inputs necessary to operate the hold gate 903. A second required input is derived from the question 2 gate 1211 which asks "Is this talker assigned to a channel?" It compares the 12 talker identity codes appearing at the memory output with the code registered by talker identity code counter 1302. When and only when the five inputs to each side of this comparison circuit agree exactly will it produce an output pulse. This pulse indicates a "Yes" answer to question 2.

Assuming that the talker identity counter 1302 has gone through 32 counts to return to a talker who had been assigned, the code of that talker is present at both inputs to the question 2 box at the proper one of the 12 channel time slots. A pulse is then produced to trigger the same talker pulser 906, and the output from this pulser provides the desired enabling pulse for hold gate 903. This same pulse is also applied to release gate 907 and to reactivate gate 904 to determine if some alternative action should be taken with respect to this talker. A third input to hold gate 903 is derived from question 3 gate 602. Question 3 is "Is this channel marked active?" As described later the channel availability code for an active channel is 0000. Therefore, the appearance of this code at the input to question 3 gate 602 causes it to produce an output pulse. This is a "Yes" response signifying that the channel now in the output part of the memory loop is being used by a talker who is active. For any other availability code the response will be a "No." When a "Yes" response is obtained it becomes the third input to hold gate 903. With the three inputs to the hold gate indicating (1) that the talker is active, (2) that he is assigned to a channel, and (3) that the channel is marked as active, the circuit is arranged to prevent any change. At the proper time the search clock pip is applied to terminal 909 and appears as the 4th input to hold gate 903 and is gated through a short delay line 911 to the reset terminal of TASI control 902. This flops the bistable multivibrator back to the idle state after any possibility of operating release gate 907 has passed. As a result no further action is taken during the talker interval and the talkspurt continues to be passed on to the channel transmission circuit. This action is repeated each time the talker identity counter identifies this particular talker for the duration of the talkspurt.

During the talker interval in which the speech detector is first found to have reverted to the idle state, a third condition is established. The talker is idle but he has an identity code circulating in the identity code memory loop together with a 0000 code in the availability code memory loop, indicating that he is active. This time the TASI control 902 remains in the idle state, thus partially enabling release gate 907. The hold gate 903 and the reactivate gate 904 cannot operate under any circumstances if the TASI control 902 is in the idle condition. As in the previous case the question 2 box 1211 responds with a "Yes" pulse to trigger same talker pulser 906, and question 3 gate 602 will also respond with a "Yes" pulse when the specified 0000 code appears. These two "Yes" responses combine with the idle or "No" response to question 1 to gate the search clock pip through the release gate 907 to release switch control 1007. This single trip multivibrator transfers release switches 1008 from the "read" to the "write" position. This, in turn, causes the 0000 (active) code to be erased from the channel availability memory and inserts a number indicating how many channels are now idle. The talker identity code is not altered, so the talker to channel connection is still maintained and reactivation of the channel is readily accomplished.

The availability code number which may be required in an entry interval is obtained during the previous entry interval (when a different talker is being considered) by counting the number of channels which are actually assigned. The difference between this number and the total number of channels is the number of idle channels. Channel assigned gate 1109 is identical to question 3 gate 602 except that it is connected further along in the output portion of the channel availability memory loop. Each time an active (0000) code appears in the channel availability memory loop during an entry interval, an entry clock pip is gated through the channel assigned gate 1009 to the assigned channel counter 1012. At the beginning of each entry interval this counter is reset to the code 0011 by way of terminal 1013. This code (0011) corresponds to the decimal number 3 and serves as a reference. If all twelve TASI channels are active, the counter will advance twelve counts to the code 1111 which is equivalent to the decimal number 15. Thus, if a talker becomes newly idle during the following search interval, the code which is entered into the channel availability memory will be 1111. In this case the channel newly marked as idle would be the only idle channel and would be made available for use by the next active talker. If one or more channels were idle during the previous entry interval, counter 1012 will not advance as far as the code 1111 but will indicate a binary number which is less than this number 1111 by the number of additional idle channels. For any availability code other than 1111, the talker assignment is not altered. The talker continues to hold the channel until such time as that channel's availability code is advanced through the queue of idle channels to the code 1111.

Another possible combination of circumstances would be as follows: (1) the talker is idle, (2) he has an identity code circulating in the memory and (3) the channel is marked as idle by the presence of an availability code number in the channel availability memory 701. As in the previous case TASI control 902 remains in the idle state while the idle talker is being considered. This partially enables release gate 907. When the identity code of the assigned talker appears in its channel position in the output portion of the memory loop it causes question 2 ("Is this talker assigned?") to be answered "Yes," which, in turn, triggers the same talker pulser 906 to provide another input to the release gate 907. Because of the availability code (not 0000) present in one output of the channel availability memory in this time slot, question 3 gate 602 responds with a "No" which cannot complete the enabling operation for release gate 907. Inasmuch as none of the action gates is enabled, no change takes place, and the talker continues to hold the channel.

As successive channels become idle they are assigned availability numbers indicating their position in the queue of channels awaiting assignment to an active channel. This method of operation permits the talker to hold a channel until it is actually needed by an active talker. When a new talker becomes active, and thus requires a channel, the channel which will be assigned is the one of the idle channels which has been idle longest and hence has had the longest time for completion of the end of the talkspurt. If this procedure were not followed, the trailing ends of the talkspurt, which may not be of sufficient magnitude to operate the speech detector, could be clipped.

Rather than have all of the logic circuits remember and operate on the channel availability number of the longest-idle channel, the availability numbers are advanced toward the end of the queue each time an idle channel is put back into active service. This is done by the add binary 0001 circuit 603 which increases each availability number by one under these circumstances.

When TASI control 902 has not been reset to "Idle" at the start of an entry interval, the conditions are established for effecting an entry. It is not known which, if any, channel will be idle. If one or more channels are idle, however, an assignment will be made and the availability code for all idle channels is brought one number nearer the reassignment code (1111) even though the actual assignment is made after the idle channel slot has passed. For this reason the addition operation is started at the beginning of each entry interval if the active indication from TASI control 902 permits the passage of a gating pip through the start addition gate 604. This triggers the addition control multivibrator 605 which, in turn, provides one enabling voltage for the add gate 606. When an entry clock pip passes through this latter gate 606, it triggers the add binary 0001 circuit 603. This causes the desired single addition to take place on an idle channel code. If the channel under consideration is active, however, this is recognized by the question 3 box 602 and a pulse is applied to the inhibit lead 607 of the add gate 606 and its operation is blocked. One other control is applied to the add gate 606. This is from the circuit 912 designated "smaller than recognizer." It is a function of this circuit 912 to determine whether the availability code in the memory output loop is smaller than the code stored in circuit 913. Normally it is smaller because availability code storer 913 is always reset to code 1111 at the end of each entry interval. This largest possible code indication is only changed when a channel is reactivated. In the present instance the smaller than recognizer circuit 912 operates and an addition takes place for each idle channel code. This advances these idle channel availability codes toward the code 1111. That channel which already has the code 1111 will be the one to which a newly active talker will be assigned, and the addition of binary code 0001 automatically changes the 1111 designation to 0000. (The final binary carry operation is omitted.) By this process the channel which was freed when release gate 907 operated is brought to the position where it is actively assigned to another talker. The same talker could be reassigned to this channel, but more frequently the same talker gets his channel back by a process of reactivation.

The conditions for reactivation are that an active talker has an identity code circulating in the memory and an availability code other than 0000. This talker is reassigned to the same channel without the necessity of going through the "disconnect" and "send identity" operations. When the system is operated in this manner the talker does not have to make his way through the system by voice enabling on every talkspurt. In fact, a substantial number of the talkspurts should be free of voice enabling if the load is only moderate. To initiate the reactivation operation, the "Yes" response to question 1 (Is this talker active?) will flip TASI control 902 to the active state thus partially enabling hold gate 903 and reactive gate 904. Hold gate 903 cannot operate because the code 0000 is not in the availability memory slot of the channel to which the talker is assigned. TASI control 902 applies its disabling voltage to reactivate gate 904 by way of disable entry switch 601, thus preventing any changes of assignment during periods when the system is unable to send out a disconnect tone. Reactivate gate 904 has the same inputs as those of hold gate 903 except that the pulse from the question 3 gate 602 (indicating that the channel in question is marked as "active") inhibits reactive gate 904 while the same pulse enables hold gate 903. Therefore, reactivate gate 904 can operate only when some code other than the active indication 0000 appears at the input of the question 3 circuit 602. The proper conditions for reactivate gate operation occur only when the identity code of the talker to be reactivated appears in a channel slot. The search clock pip which is gated through reactivate gate 904, triggers reactivate switch control 915 which, in turn, flops TASI control 902 back to its idle condition and operates reactivate switches 916. This operation of the reactivate switches 916 sends the channel's availability number to the availability code storer 913. Transferring the availability code to this circuit writes a 0000 code into the channel availability memory circuit. This once again marks the channel as actively assigned to the particular talker. Now, however, one channel has been removed from the queue of idle channels before that channel was advanced to the code 1111. This gap is closed by advancing by one number all of the availability numbers which are smaller than the number of the channel which was removed. The channel availability code number 1111 is at the head of the queue, and this number represents the channel which has been idle longest and which will be used next for a newly active talker.

When a completely new channel assignment was made all of the availability numbers could be advanced. In this case, only those numbers which are smaller than the availability number of the reactivated channel are changed. This is accomplished by the smaller-than-recognizer circuit 912. This circuit compares the code in the availability code storer 913 with each of the codes appearing in the output of the availability memory. When a number appears in the memory output which is smaller than the stored number, circuit 912 operates to produce one of the enabling inputs to the add gate 606. Note that add gate 606 is inhibited by the active code indication 0000, so a pulse from the circuit 912 does not cause any change in an active code indication.

As in the case of a new assignment, it is necessary to start the add binary 0001 operation (see box 603) at the beginning of the entry interval to be sure of including all 12 channel positions. Because TASI control 902 is reset to "Idle" by reactivate switch control 915, the start addition gate 604 cannot operate. Instead, the addition control flip-flop multivibrator 605 is set to enable add gate 606 by the reactivate switch control 915 when the switch control is first operated. Even when this occurs during the search interval no addition takes place until the entry clock pips are applied through terminal 609 to add gate 606. During the entry interval, each of the smaller channel availability code numbers is increased by one and thus fill up the gap caused by the channel reactivation, the other numbers remaining as they were. When the talker assigned to the reactivated channel again becomes idle that channel is treated just like any other newly idle channel and is placed at the end of the queue of idle assigned channels.

A final possible condition is that an idle talker is not assigned to a channel. Since this talker needs no service no change need be made. The only active gate which could be enabled by an idle talker is the release gate 907. However, since the response to question 2 (Is this talker assigned?) is a "No," same talker pulser 906 is not operated and the release gate 907 remains disabled.

The manner of switching audio signals from the talker input lines to the assigned channels will now be discussed before proceeding to the description of the disconnect and identity control information generation and application to the proper channel. As each talker identity appears in the output portion of the memory loop associated with memory 702, it is first standardized by the code regenerator 705. It is then passed through the normally closed disconnect switches 714 and the normally closed entry switches 712 to the cathode followers and inverters 1021. Each digit of the code is inverted and the original and inverted versions are applied to cathode followers. These provide the low impedance sources of identification code which drive the speech sample wiring matrix 1022. The 31 audio samplers 1221, 1222, etc., are wired to this matrix to that any given sampler operates when the identification code of its respective talker appears on the matrix 1022. They are varistor-controlled gates of the same type as those used for activity sampling, and the wiring pattern is also the same.

As each talker identity code appears on the wiring matrix it opens the appropriate gate and gates a sample of about one microsecond duration onto the common time separation multiplex bus 1301. The signal on this bus then appears as a time separation multiplex of the selected 12 talker's signals. The individual channel identity is maintained through the assignment of each talker to a particular time slot. The amplitude modulated pulses are passed through the send-control switch 801 to the pulse amplitude distributor 1115. This circuit corresponds to the synchronous commutator 401 of the simplified circuit diagram and sorts out the speech samples to the particular transmission channels, A through L, to which the talkers have been assigned. The distributor gates 1121, 1122, etc., for the twelve channels are of the same type as the audio sampling gates 1221, 1222, etc. However, instead of being controlled by the randomly assigned talker codes from the circulating memory 702, the distributor gates are systematically operated by the binary code which is generated by the 12 channel distributor control counter 1104. The 4-digit binary code from this counter is connected to the channel distribution wiring matrix 1125 through the cathode follower unit 1126 which operates in the same manner as the cathode followers 1303 in the output from the talker identity code counter 1302. The 12-channel distributor counter 1104 is locked in light synchronism with the circulating memory units 701 and 702. As each audio sample switch 1221, 1222, etc., is closed, the appropriate distributor switch 1121, 1122, etc., is also closed so that the audio samples are at once distributer to the assigned channels. After the samples are passed through the low pass audio filters 1131, 1132, etc., the resulting output signal is a replica of the talker's input signal for as long as the assignment between talker and channel is maintained. This universal access switching arrangement only requires a number of switches for the signal paths equal to the sum of the number of talkers plus the number of channels. Each talker's signal must pass through two electronic switches and a filter. Amplifiers (not shown) may be coupled between the low pass filters 1131, 1132 and the channel output terminals A through L if greater signal intensity is desired.

When an idle channel becomes the channel which has been idle longest and has advanced to the head of the queue of idle channels in the channel availability code memory 701, the talker assigned to this channel is disconnected and a disconnect signal is sent to the receiver. This prepares the system for the assignment of a newly active talker and minimizes clipping of the beginning of the talkspurt of the newly active talker. During the entry interval in which an assignment is made, one idle channel has its availability code converted from 1110 to 1111 by the addition of binary 0001 by the circuit 603. On the next appearance of this code 1111 at the channel availability memory output it operates the "use next" recognizer 706 which provides one of the enabling inputs to the disconnect gate 716. The talker's identification which was associated with the above-identified availability code time slot appears in the talker identity memory output at the same time. Because this code contains at least one pulse it cannot operate the disconnect code recognizer 707. Circuit 707 normally provides an inhibiting input to disconnect gate 716. However, because this inhibiting control is removed during this channel interval, an entry clock pip is gated through the disconnect gate 716 from terminal 708 to trigger disconnect switch control multivibrator 717. This control unit transfers the disconnect switches 714 from their normal position. The opening of the disconnect switches 714 disconnects the talker and inserts a 00000 code into the talker identity memory. It is possible to erase pulses from the pulse groups which operated disconnect gate 716 because of the one-half channel interval delay introduced by the delay units 718. The 00000 code is that of the 32nd combination of the 5-digit identification code. This disconnect code operates the disconnect sampler gate 1305 just like other identification codes operate the audio sampler gates 1221, 1222, etc. Instead of a talker being coupled to the time separation multiplex bus 1301, the output of the disconnect tone filter 1031 is connected to the TSM (time separation multiplex) bus 1301 when the disconnect code 00000 appears in the output of the talker identity code memory loop and operates the gate 1305 The narrow band pass filter is tuned to a harmonic of the short pulses generated by harmonic tone pulser 1307. The frequency of the disconnect tone filter 1031 is above the normal audio band but still within the 4000 cycle band of the channels A through L which interconnect the TASI transmitter and receiver. The pulser will be discussed further in connection with identification signaling control. The samples of the disconnect tone are distributed to the channel from which the previous talker has been disconnected. The disconnect tone which is reproduced at the output of the disconnect tone filter 1031 is passed on to the receiver in order to disconnect the channel from the listener at the receiver. Because a significant interval of time is required for the recognition of the disconnect tone at the receiver, the channel is not assigned to a new talker until approximately 5 milliseconds has elapsed. This function is instrumented through the disconnect switch control 717 and the minimum disconnect interval multivibrator 611. When the disconnect switch control multivibrator operates, it also triggers minimum disconnect interval multivibrator 611 which puts out a pulse for about 5 milliseconds and opens disable entry switch 601. As long as disable entry switch 601 is open, no new assignment or reactivation assignment can be made. Therefore, no availability code can be changed, and the 00000 code continues to circulate and the disconnect tone is sent to the receiver. If any channel becomes idle during this minimum disconnect interval the normal assignment of an availability number can take place. Because the 1111 code is in the availability memory, the assigned channel counter will not count up to 1111. Therefore, some lower number will be recorded in the newly idle channel availability code slot. This number cannot be altered until after the minimum disconnect interval. This arrangement by which channels may be marked as "idle" during the disconnect interval improves the chances of having another idle channel in a position to be disconnected. A disconnect tone is usually sent out in one channel while the identity code is being sent out on the channel which was just assigned. This means that in periods of heavy load the talker assignments are held up only long enough for the disconnect signal to be transmitted.

This much delay is probably desirable in order to prevent clipping of the ends of the previous talkspurt. After the disconnect tone interval has been completed, the channel is prepared to receive a new assignment. As long as no talker becomes newly active, the 00000 disconnect code continues to circulate in the identity memory, and the disconnect tone is transmitted to the receiver. When a new assignment is made, as outlined hereinbefore, the 00000 code is replaced by the talker identity code as registered by the talker identity code counter 1302 by means of the entry switches 712. In addition to inserting the talker identity code this switching operation writes a single pulse into the check position memory 713. This pulse is written into the time slot of the channel to which the new assignment is made.

The check pulse has the dual function of causing the identification code assigned to that channel to be sent out, and of initiating a channel assignment checking operation. The channel identification signals which are employed are made up of a series of audio tones such as are used in carrier multiplex telegraphy. Specifically, the harmonic tone pulser 1307 is driven at a 200 cycle rate and produces short pulses rich in harmonics. The digit tone filters 1041 through 1045 are tuned to harmonics of this 200 cycle rate. The digit 1 tone filter 1031 is tuned to the 400 cycle second harmonic, the digit 2 tone filter 1042 is tuned to the fifth harmonic at 1000 cycles, the digit 3 tone filter 1043 is tuned to the eighth harmonic at 1600 cycles, the digit 4 tone filter 1044 to the eleventh harmonic at 2200 cycles, and digit 5 tone filter 1045 is tuned to the fourteenth harmonic at 2800 cycles. The disconnect tone filter 1031 passes the eighteenth harmonic at 3600 cycles. When excited by the pulse output from the harmonic tone pulser 1307, each of the digit tone filters 1041 through 1045 will ring and produce in their output a sinusoidal wave which can be sampled. Each filter output is connected to one of the digit tone samplers 1051 through 1055, which are varistor gates actuated by a "1" in the binary code. Each sampler 1051 through 1055 is connected to one of the talker identity code memory output leads. When a pulse is presented, indicating a binary "1" for any digit, that pulse actuates the associated sampler, causing a sample of the digit tone to be taken and passed through one of the summing resistors 1061 through 1065 to the summing amplifier 1068. If a binary "0" is presented for the digit in question, the sampler does not operate and no tone is fed into the summing amplifier from the tone filter representing the particular digit. The resultant at the output of the summing amplifier is an amplitude modulated pulse which is equivalent to that which would have been obtained by switching the outputs from selected filters into a common load and sampling the resulting voltage. Inasmuch as each of the twelve talker identity codes stored in the memory causes a sample to be taken, the output of the summing amplifier appears as a train of twelve amplitude modulated pulses. Each of these pulses represents an instantaneous sample of the talker identity code in multifrequency form. Although only one of the twelve pulses is used in any one operation, they are all made available. The one which is used is determined by the single pulse circulating in the check position memory unit 713.

The check position memory pulse is applied to a number of circuital units which will now be considered. When the check position memory pulse is applied to the sample-and-hold gate 802, the amplitude modulated pulse which is then in the output of the summing amplifier 1068 is resampled and stored. The check position memory pulse which operates sample-and-hold gate 802 is passed through send-connect identity gate 803 and through the "Or" gate 804 to trigger the send-code single trip multivibrator 805. This single trip multivibrator 805 transfers send-control switch 801 away from the time separation multiplex bus 1301 and couples the tone sample appearing at the output of sample-and-hold gate 802 into the time separation multiplex bus leading to the distributor, in place of the audio sample from the newly connected talker which would otherwise have appeared on the time separation multiplex bus 1301 at the input to the channel distributor. Thus, at the beginning of an assignment, the signals which are distributed to the channel are samples of the multifrequency talker identification code. When these samples are passed through the low pass filters 1131, 1132, etc., they appear as a summation of continuous waves of the selected frequencies representing the talker identification code.

These tones are transmitted for a time sufficient to permit recognition at the receiver. This time interval which may, for example, be five milliseconds, is controlled by minimum identity interval single trip multivibrator 807. The multivibrator 807 is triggered by a pulse from entry switches control 711 at the time when control 711 transfers the entry switches 712 for talker assignment. The send-connect identity gate 803 passes the check position pulse during the five millisecond interval while the minimum identity interval multivibator 807 is on. When this multivibrator 807 turns off (for another five millisecond period), gate 803 is disabled, and the send-code circuit 805 cannot be triggered. Send-control switch 801 then remains in its normal position connecting the time separation multiplex bus 1301. For the remainder of the channel assignment the audio samples are passed on to the distributor.

The TASI system being described has the desirable feature that a talker retains a channel even though he is idle until he has been idle long than any other idle assigned talker. In periods of light loads a talker may be connected at the beginning of a conversation and may hold the channel throughout the conversation. The process of reactivation can be carried on without sending control data to the receiver. Control data need only be sent to the receiver when a change of assignment is effected. This has the advantage of minimizing the amount of control information which must be sent to the receiver systematically. However, if no checking operation were provided, erroneous connections might be maintained for considerable periods of time. A checking method which employs idle channel time is, therefore, incorporated into the present system.

In order to have a channel ready for assignment at the earliest possible moment, the idle channel which progresses to the head of the queue of idle channels is at once disconnected. A disconnect tone is sent for the minimum disconnect interval and the channel is then ready for assignment. Normally, there will not be a newly active talker awaiting assignment. Even in periods of heavy load several tens of milliseconds may elapse before a new assignment need be made. In periods of moderate load this may run to seconds. The disconnect tone need not be discontinued at the end of the minimum disconnect interval but may be sent as long as the channel is not needed to insure more positive recognition of the disconnect tone. The disconnect tone occupies the upper portion of the audio band. In accordance with the checking system disclosed hereinafter, the multifrequency identification codes of the other connected talkers are sent over to the receiver in the audible portion of the band accompanied by a disconnect tone, as long as the channel is not needed by an active talker. When the channel is needed, however, the disconnect tone is removed at once and the connect identity code will be transmitted to the receiver. The connect identity code is distinguished from the checking codes by the absence or presence, respectively, of the disconnect tone. When a connect code is transmitted the identified talker is, of course, assigned to the channel over which the connect identification code is transmitted. The check identification codes, however, are sent over the disconnected channel but they identify all of the talkers assigned to other channels as well as giving the 00000 code indicating the disconnected channel. In the checking operation the channels are checked sequentially, starting with the last channel which has been assigned and proceeding through all of the twelve talker identity codes circulating in the talker identity memory. This gives a random starting point for the checking operation and checks the last assigned channel first, because this channel is most likely to be incorrect. A complete check of all twelve channels will be repeated over and over again until the time the disconnected channel is required for another talker. When an assignment of that channel is made, it is the first one to be checked when another channel is disconnected. With this arrangement the checking starts at a random channel as dictated by the assignment, and therefore, the chances of checking all channels with a very few checks after each assignment under heavy load conditions are improved.

A feature of the checking system in accordance with the invention is that the time when a check is most needed is also the time when many checks can be made. Specifically, in periods of light load, channel assignments will be made infrequently and errors could persist for substantial periods of time. Under these conditions, however, many checks can be made because the idle channel which is used for checking will not often be assigned to a new talker. In periods of heavy load when little time is available for checking, all of the channel assignments are changing frequently. Under these conditions any possible errors will not persist for substantial periods of time because new assignments are soon made which replace the erroneous ones.

If a single check code were sent out to identify a channel assignment and this disagrees with the code which is in use, it is impossible to determine which code designation is correct. In order to resolve this difficulty the checking system employed in the present TASI transmitter employs two check codes which are successively transmitted for each channel position before the next successive channel is checked. Logic circuits in the receiver retain the stored code if either one of two successive check codes agrees with the code indication stored in the receiver. However, if both of two successive check codes do not agree with the stored code, the last check code is substituted in the receiver memory for the stored code indication.

Proceeding to consider the instrumentation for the checking operation, the check position memory unit 713 is our starting point. The check position pulse which was written into this portion of the circulating memory at the time of making an assignment continues to circulate in the memory in that channel slot until some erasing or transfer operation is effected. Accordingly, the channel in which the most recent assignment was made is identified at the transmitter by the location of this check position pulse. Each time this pulse appears in the output portion of the memory loop, it will cause the multifrequency identification sample of that talker to be resampled and held by the gate 802, as discussed hereinbefore for the talker connection code. The hold function of the circuit 802 is required because the identification of all of the talker identity codes which are circulating in the talker identity memory must be sent over the idle channel which does not, of course, coincide with the time position of the talker identity code which is being transmitted over this idle channel.

The disconnected channel which is used for checking is identified by the operation of disconnect code recognizer 707 when the 00000 disconnect code appears in the output talker identity memory. The pulse from disconnect code recognizer 707 is passed through the send-check code gate 811 when the other conditions for enabling this gate are met. This pulse which appears when the disconnect channel sample is applied to the audio time separation multiplex bus is passed through the "Or" gate 804 and triggers send-code multivibrator 805. This multivibrator transfers send-control switch 801 as discussed hereinbefore for the connect code, and causes the stored check code from circuit 802 to be substituted for the sample of the disconnect tone filter 1031 output which would otherwise be present. This passes the check identification code on to the receiver through the usual distribution procedure but has eliminated the disconnect tone which is used as a marker to indicate that the code is in reality a check code and not a new assignment code. Instead of applying the disconnect tone to the time separation multiplex bus, a sample of this disconnect tone is added to the other digit tone samples by disconnect tone sampler 1069. This sampler is similar to the digit tone samplers 1051 through 1055 and is connected to the summing amplifier 1068 through the resistance 1070. In order to prevent the actuation of the disconnect tone sampler gate 1069 while the connect identity code is being transmitted, an inhibit lead 812 is connected to this sampler gate 1069. As soon as the minimum interval is over and the multivibrator 807 turns off, the sampler 1069 is enabled, permitting a sample of the disconnect tone to be passed through with the balance of the control code samples. The particular talker identity code which is to be transmitted as a check will then have the disconnect tone added to the sample which is held by gate 802 for transmission to the receiver.

The method of moving the check position to the next talker identity memory slot after appropriate time intervals have elapsed will now be considered. The length of each check code is determined by the check duration multivibrator. When this multivibrator 813 is in the "On" state it enables send-check code 811 and permits the transmission of the check code if a disconnected channel exists. In order to prevent the enabling of send-check gate 811 while the disconnect signal is being sent out, this multivibrator is driven to the "Off" condition and held there by lock-up multivibrator 814. This multivibrator is turned on by entry switch control 711 at the time a new assignment is made. It is turned off by the trailing edge of the minimum disconnect interval pulse from the single trip multivibrator 611. When the check duration multivibrator 813 turns on, the check code is sent in the disconnected channel. When the multivibrator reverts to its "Off" state, in its natural cycle of operation, the check code is no longer transmitted and the disconnect tone obtained in the regular audio sampling manner is sent instead. Each check code is followed by an interval of pure disconnect tone in order to separate the two codes used in the double checking procedure, and to clearly distinguish the disconnect tone from the other multifrequency tone signals. This serves to avoid confusion with connect identity codes which are sent without the disconnect signal. The second check code is sent out when the check duration multivibrator turns back on. After the second "On" cycle is completed, the check position pulse is advanced to the next channel slot.

At the time the assignment is made, transfer counter 815 is reset to its 0 condition by lock-up multivibrator 814. The single stage transfer counter 815 completes a cycle for each two input pulses from the check duration multivibrator 813. At the end of the first "On" interval, check duration multivibrator 813 triggers transfer counter 815 to the "On" condition. At the end of the second check interval, transfer counter 815 is turned off again. When this occurs the transfer multivibrator 816 is triggered to the "On" condition, partially enabling the check position transfer gate 817. When the check position pulse appears in the memory output loop, it passes through this enabled gate 817 to reset transfer multivibrator 816, and also operates switches 719 and 720 in the check position memory loop. The first of these switches, erase old check pulse switch 719, is transferred to a position which removes the pulse from the memory. Inject new check position pulse switch 720 inserts a new pulse into the memory one time slot later than the pulse which was erased. The necessary delay is provided by the delay which occurs in the regeneration process and the additional delay in the output portion of the memory path. By the time this new pulse appears at the check position transfer gate 817 the gate is disabled by the reset of transfer multivibrator 816. During the next two cycles of the check duration multivibrator 813, a multi-frequency tone check code for the talker who is assigned to the newly marked channel is sent out, provided the disconnect condition still persists. The pulse in the check position memory is advanced once each time the check duration multivibrator completes two cycles. Thus, after twenty-four cycles the check pulse returns to the channel which was originally checked. With the check duration multivibrator 813 completing one cycle in approximately ten milliseconds it takes about 240 milliseconds of "undemanded idle channel time" to complete one check of all twelve of the channel assignments. Complete checks of the channel assignments are thus accomplished frequently. The transfer of the check position from one channel to the next successive channel continues until the disconnected channel over which the check codes are being sent is assigned to a newly active talker.

When entry switches control 711 operates at the time of making a new channel assignment it triggers erase check multivibrator 821. Erase check multivibrator 821 is a single trip multivibrator which has an "On" period of precisely eleven channel periods. It is turned off at the end of the eleventh period by a channel clock pip. This single trip multivibrator 821 opens erase check gate 822 for eleven periods at a position in the output loop before the entry switches 712 in order to remove the check pulse from any one of eleven time slots. The entry switch for the check position memory writes a pulse into the twelfth position corresponding to the position of the new channel assignment. Accordingly, this channel will be checked first after the longest-idle channel is disconnected.

Proceeding to a consideration of the detailed block diagram of the TASI receiver which is shown in Figs. 14 through 19 of the drawings, it will first be compared with the simplified diagram of Fig. 2. The channel inputs A through L which appear on the left-hand side of Fig. 2 are shown across the top of Fig. 14, and the listener outputs which are shown at the far right-hand side of Fig. 2 appear in the detailed receiver block diagram at the bottom of Fig. 17. The collection commutator 202 of the simplified diagram finds its equivalent in the switching matrix 1401 of the detailed block diagram. In addition, the talker identity memory 206 corresponds to the talker identity code memory 1801 and its associated output memory loop as shown in the detailed drawing of the receiver.

The TASI receiver is required to transform an input collection of talkspurts, disconnect frequency tones, and multifrequency identity codes into a coordinated arrangement of output conversations. The way this is accomplished will now be discussed in detail.

The operations of the TASI receiver are carried out in time sequence in a manner which is complementary to those of the transmitter. Each of the twelve channels A through L must be identified by a position in time relative to the other eleven channels. This identification is established by the first three boxes of the timing circuit which are identical to those of the transmitter. They are the 768 kilocycle crystal oscillator 1406, the blocking oscillator 1407, and the twelve channel control counter 1408. The counter circuit 1408 is identical with the twelve channel distributor counter 1104 in the transmitting unit. In response to the 768 kilocycle pips from the blocking oscillator 1407 the counter 1408 counts through the twelve counts of a four digit binary code and is then reset to the starting indication. As each code is generated and applied to the channel collection wiring matrix 1401, it enables one of the twelve channel collector gates 1411–A through 1411–L. The coincidence selectors in these gates produce a sequence of twelve pulses which is employed to close the collector gates and thus sample the twelve channel input signals. The pulses produced by the coincidence selectors 1411–A through 1411–L are also employed to operate disconnect collector switches 1414–A through 1414–L in the same sequence and at the same times. The timing operation of these disconnect switches 1414–A through 1414–L establishes the channel position in the circulating memory 1801 because the required disconnect operation can only take place when the disconnect collector switch associated with a particular channel is closed.

The first operation which will be considered is the determination of which channel, if any, is carrying a disconnect tone. The disconnect tone is above the subscribers' audio frequency range so it can only be produced by the TASI transmitter or some unwanted interference. The output filters included in circuits 1701, 1702, etc., at the listener position prevent the disconnect tone from reaching the listener. A disconnect tone filter 1412 is bridged across each of the twelve input lines into the receiver system. When a disconnect tone is present on one of the channel input lines, it passes through the appropriate disconnect filter 1412 to a varistor rectifier and capacitor which constitute a peak envelope detector. When this envelope builds up sufficiently it operates the disconnect slicer 1413 for that particular channel. Because the disconnect signal tone is only applied to one channel at a time, there is little likelihood that two slicers will operate at once. To insure the operation of only one slicer 1413 at a time the lock-out circuit 1415 is provided. While the sensitivity of all of the unoperated slicers is reduced by the lock-out circuit 1415 when one of the slicers becomes operative, as soon as the connect identity code is recorded all slicers are returned to normal sensitivity.

When one of the disconnect slicers 1413–A through 1413–L operates it closes the appropriate coded tone switch 1415–A through 1415–L. This closed coded tone switch connects the channel over which the disconnect tone is arriving to the bank of digit tone filters 1601 through 1605.

As mentioned hereinbefore, the output of each of the disconnect tone filters 1412–A through 1412–L is sampled in turn by the disconnect collector switches 1414–A through 1414–L which are operated in synchronism with the twelve channel collector gates 1411–A through 1411–L. The one disconnect slicer 1413 which is operated (and during some intervals none are operated) produces a pulse on the disconnect time separation multiplex bus 1416. The samples from the other disconnect slicers 1413 produce space indications instead of the pulse indication which results from the operated disconnect slicer. The one pulse from the operated disconnect slicer 1413 triggers disconnect switches control 1501. This single trip multivibrator in turn produces a pulse having a duration of one channel time slot which causes the insertion of a 00000 code into the talker identification memory path by the disconnect switches circuit 1802. This disconnected code 00000 now circulates in the talker identification memory loop in place of the code of the talker who was disconnected. This prevents the passage of additional samples of the signal on that channel to the listener and it marks the particular channel time slot with a unique code identifying the channel which will be the next channel to receive an assignment. Subsequent samples of the operated disconnect slicer 1413 output again trigger the disconnect switches control 1501 and repeatedly inject the 00000 code in place of itself until a new talker identity code is written into the memory. The multifrequency talker identity codes which appear on the coded tone bus 1417 are converted back to a binary code in parallel form by circuits 1601 through 1610 which are similar to those of a carrier telegraph demultiplexer. The signals from that channel which is connected to the coded tone bus 1417 are applied continuously to the bank of five digit tone filters 1601 through 1605 and to one additional disconnect tone filter 1611. The filters 1601 through 1605 are tuned to their respective digit frequencies established by the digit tone filters 1041 through 1045 and the harmonic tone pulser 1307 in the TASI transmitter. The filters 1601 through 1605 and 1611 operate into a peak envelope detector and a slicer which are substantially the same in operation as the circuits 1412–A through 1412–L. The outputs from the digit slicers 1606 through 1610 are on or off pulses representing the presence or absence respectively of the tone envelope. Thus the output from the digit slicers 1606 through 1610 serve to transform the multifrequency coded tone signals which were sent over the disconnected channel back into the binary form from which the multifrequency tone signal was derived. The output from the five slicers is a parallel representation of the identity code in binary form suitable for insertion in the circulating memory loop associated with the talker identity code memory 1801. The individual channel disconnect slicers 1413–A through 1413–L will remain operated even if the disconnect tone has disappeared. Because of their delayed release feature, use will be made of the disappearance of the disconnect tone to start the timing of the minimum identity interval. An additional disconnect tone filter 1611 and associated slicer 1612 (which does not have a delayed release) are therefore connected to the coded tone bus 1417 in a manner similar to the connections of tone filters and slicers 1601 through 1610. Any code combination which arrives may now be registered in this circuital arrangement including the components 1601 through 1612.

The first code to arrive is that of the disconnect tone by itself. This operates the disconnect slicer 1612. When a new assignment is made at the transmitter the disconnect tone is removed and the connect talker identity code tones are sent across from transmitter to receiver in the same channel. After these new tones have been present on the coded tone bus for about five milliseconds, sufficient voltages are developed at the outputs of the digit tone filters 1601 through 1605 to operate selected ones of the digit slicers 1606 through 1610. At the same time the voltage at the output of disconnect tone filter 1611 is decaying until the envelope voltage is insufficient to maintain the operation of disconnect slicer 1612. The trailing edge pulse which occurs when this slicer 1612 is turned off triggers minimum interval multivibrator 1502. This single trip multivibrator delays the recording operation until the end of the five millisecond interval, thus providing sufficient time to insure the positive operation of any of the slicers 1606 through 1610 which should respond to the incoming multifrequency coded tone.

The output of the minimum interval multivibrator 1502 is applied to the identity code center gate 1503 as an inhibiting voltage. The output from the disconnect tone slicer 1612 is also applied through a short delay element 1521 to the identity gate 1503 as an inhibiting input. Therefore, the identity code center gate cannot operate as long as either the minimum interval multivibrator 1502 or the slicer 1612 are operative. After both circuits 1502 and 1612 are deenergized, identity code center gate 1503 can pass the pulse produced by the disconnect code recognizer 1504 when the 00000 code appears in the one channel time slot which is disconnected. The pulse which is passed through identity gate 1503 triggers the record switches control multivibrator 1505 which in turn transfers identity code record switches 1901 from their normal to the "write" position for one channel interval. During this period the "Off" or "On" condition of each of the digit slicers 1606 through 1610 is written into the circulating memory in place of the 00000 disconnect code.

The talker identity memory 1801 and its associated output loop is similar to that of the transmitter. The pulses in the output loop appear at the cathode followers and inverters 1902 for control of the distribution operation through the distribution matrix 1903. The pulses are then fed back into the circulating memory unit 1801 which delays them for eleven channel intervals. The pulses circulating in the memory are regenerated on each trip by the regenerator 1803.

The pulse from record switches control multivibrator 1505 is also applied to the reset terminal of all of the channel disconnect slicers 1413. The one disconnect slicer which had been operative is then released because the disconnect tone which might otherwise reactivate the slicer must be absent before the record operation can take place. When the disconnect slicer 1413 turns off it opens coded tone switch 1415 thus removing the channel signals from the digit filters.

Inasmuch as the disconnect sampling operation now finds the channel disconnect slicer in the off condition, no pulse is present in that channel to trigger disconnect switches control single trip multivibrator 1501 and the newly recorded talker identity code is permitted to circulate until a disconnect tone is again received in that channel position.

The method of collecting the channel signals into a time separation multiplex of twelve amplitude modulated pulses has been developed in considerable detail in the discussion of the TASI transmitter. The operation at the receiver is the inverse of that at the transmitter. Each count of the twelve channel counter 1408 causes the operation of one channel collector gate 1411–A through 1411–L, and connects the particular channel to the common time separation multiplex bus 1421 for the duration of that particular count. With the crystal oscillator 1406 having a frequency of 768 kilocycles, the period for each count is approximately 1.3 microseconds and a new sample of the same channel is taken approximately every 15.6 microseconds.

These samples are applied at once to the input of all the distribution gates 1711, 1712, etc., by way of the time separation multiplex bus 1421. These distribution gates 1711, 1712, etc., are of the same configuration as the varistor gate 1221 in the TASI transmitter. As the twelve talker identity codes circulating in the talker identity memory 1801 appear at the cathode followers 1902 in the output memory loop, they are applied to the distribution wiring matrix 1903 and successively operate the appropriate distribution gates 1711, 1712, etc. Thus, the proper channel collector and talker distribution gates are operated simultaneously and a direct connection to the listener is made by two electronic switches. The distributed samples are then passed through the audio filters and amplifier circuits 1701, 1702, etc. The output is a replica of the talker's original signals which passed through the transmission circuits. In general, this is all of the talkspurts of the talkers with a very occasional clip of the beginning or trailing sounds included in the talkspurt.

In the present TASI transmitter and receiver system connect identity codes are sent only when a new assignment is made, and a disconnect tone is sent only when a talker finally has his channel taken away after becoming the longest-idle talker. Since this method permits the maintenance of connections for long periods, particularly during light loads, the checking system discussed hereinabove in connection with the transmitter has been provided. The manner in which the receiver recognizes the check codes, keeps track of the channel to which the check code is applicable, decides whether or not an error exists, and then corrects the stored code, if this is necessary, will now be discussed.

As stated above in connection with the transmission of check code signals, the check code transmission is started shortly after the minimum disconnect interval is completed and the first identity check code to be transmitted is that of the talker who has just been assigned. Therefore, the channel to be checked is the one which had the most recent disconnect tone. This channel is marked by storing a pulse in the check position memory 1805 and its associated output loop circuits. At the time the minimum interval multivibrator 1502 is triggered, just prior to recording a normal talker identification code, the check position memory is cleared of any existing check pulse. This is accomplished through the operation of the erase check switch 1804 for the duration of the "On" period of the multivibrator 1502. After the check position memory is cleared, a new pulse is written into the check position memory simultaneously with the talker identity code for the new connection. The pulse from record switches control multivibrator 1505 passes through connect code gate 1507 when a new connect code is recorded, because the inhibit voltage from disconnect slicer 1612 is not present at gate 1507. This serves to distinguish between connect and check codes and indicates that the code under consideration is, in reality, a connect code. The pulse from connect code gate 1507 passes through "Or" gate 1614 and operates the inject pulse switch 1615 simultaneously with the operation of identity code record switches 1901. This same pulse from connect code gate 1507 triggers lock-up flip-flop multivibrator 1616 to the lock-up position. This operates in a similar manner to the lock-up multivibrator 814 in the TASI transmitter. The multivibrator 1616 first resets check duration multivibrator 1905 and transition counter 1906 to the "Off" position and holds them in this condition. This prevents a check pulse from being moved to any other channel time slot until an appropriate interval after the disconnect tone reappears in one of the channels. It is over this latter channel that the check codes arrive for a period which lasts as long as the channel is not required by a newly active talker.

When a disconnect tone is received at the receiver, it operates disconnect slicer 1413 and coded tone switch 1415 for the particular channel. The signal appearing on the coded tone bus operates disconnect tone filter 1611 and slicer 1612. When slicer 1612 is operated it triggers lock-up multivibrator 1616 to the "Off" state and release check duration multivibrator 1905 and transition counter 1906. Check duration multivibrator 1905 is adjusted to have substantially the same time period as the comparable check duration multivibrator 813 in the transmitter and thus follows the appearance of the check codes. If a check code is actually transmitted the first one always starts after the minimum disconnect interval. This code normally is not 00000, and consequently at least one of the digit tone filters 1601 through 1605 will be operative. When one or more of the digit slicers 1606 through 1610 is operated by the incoming tones, the check group "Or" gate 1618 is operated and turns on the check group slicer 1619. This slicer 1619 is thus turned on during the time a check code (or connect code) is being sent. It is turned off during the interval between check codes when only the disconnect signal tone is being sent. The differentiated leading edge of the square wave produced by this slicer 1619 synchronizes check duration multivibrator 1905 with the transitions of the check code. During the substantial interval while the pair of check codes indicating the disconnect channel 00000 are being transmitted, the check duration multivibrator is free running because none of the digit slicers 1606 through 1610 will operate the check group gate 1618. However, with the transmitting check duration multivibrator 813 and the receiving check duration multivibrator 1905 having substantially the same periodicity, this time gap is bridged without loss of synchronism. While the transmitter multivibrator 813 is symmetrical, the receiver check duration multivibrator 1905 has an "On" period which is substantially shorter than its "Off" period. The "On" period of multivibrator 1905 is sufficiently short that it turns off at the time when the output voltage of the selected digit tone filters from the group 1601 through 1605 has built up to a maximum. This is the time at which a check comparison is made between the code circulating in the designated channel slot of the memory and the code registered by the digit slicers 1606 through 1610. The enabling pulse to cause this comparison is produced by check interval timer 1907. This timer 1907 is triggered to the "On" condition by the trailing edge pip from the check duration multivibrator 1905. This trailing edge is synchronized by one of the group clock pips which occur at the start of each memory revolution. The check interval timer 1907 is turned off by the next group clock pip and it is, therefore, operative for one complete appearance of the stored codes in the memory. One of the functions of this timer 1907 is to operate check position transfer gate 1909. This latter gate 1909 is energized on every other operation of the timer 1907 by the transition counter 1906. The transition counter 1906 counts two appearances of each check code before permitting the advancement of the pulse stored in the check position memory. On the second count of counter 1906 the pulse from check interval timer 1907 is gated through check position transfer gate 1909 to operate erase old check switch 1910.

When the pulse circulating in the check position memory appears, it is routed by the erase old check pulse switch 1910 through the delay unit 1912 to the insert new check position gate 1913. Because the delay line 1912 is one channel interval longer in its time delaying action than the delaying units 1915, the new check position pulse circulates in the memory with the talker identity code associated with the channel which follows the channel formerly associated with the check pulse which has been erased. The check pulse is thus delayed one channel interval for each pair of counts of the transition counter 1906. After twenty-four counts the check pulse has stepped backwards through the twelve channels of the TASI system and has returned to the starting position. This retrogression of the check memory position pulse continues until an erasure and lock-up occurs through the operation of the minimum interval single trip multivibrator 1502 as the new connect assignment code arrives. Another check code tracking operation follows the completion of the new channel assignment.

To review the tone signaling procedure which was discussed in connection with the transmitter, the following combinations of digit tones and disconnect signal are possible: First, the disconnect signal alone indicates that the channel should be disconnected from the talker and listener associated therewith. A combination of digit tones without the presence of the disconnect signal tone indicates that the identified talker and listener should be connected to the channel on which the tones appear. When both the digit tones and the disconnect signal are sent concurrently, a checking operation is indicated. During the checking of any one channel the digit tones are sent in conjunction with a disconnect signal for the first checking operation, then the disconnect signal is sent alone and the second checking operation repeats the same digit tones with the disconnect signal still being present. After a particular channel is checked twice the same procedure is repeated with a new set of digit tones for the channel which follows the previously checked channel.

Once the tracking operation has established which of the channels is being checked, a comparison of the code being circulated in the memory for that channel, and the check code which is registered by digit slicers 1606 through 1610, is made. The pulse from check interval timer 1907 is applied to the check-now gate 1621, and other inputs to this gate 1621 are applied from the disconnect slicer 1612 and the check position memory output loop. When the check position pulse appears with a disconnect tone present and the timer on, it is gated through circuit 1621 and provides one of the enabling pulses for no-error gate 1511, for possible-error gate 1512 and for probable-error gate 1513. Another input to these three gates is derived from check code comparator 1514. The comparator circuit 1514 compares the talker identity code circulating in the memory with the code registered by the digit slicers 1606 through 1610, and is similar in operation to the question 2 box 1211 in the transmitter in that it yields an output pulse when its two sets of inputs are identical. When the code circulating in the memory and the code registered by the digit tone slicers agree, an enabling voltage is applied to the no-error gate 1511 and to inhibit inputs at the possible-error gate 1512 and the probable-error gate 1513. The remaining input to these gates is from the output loop of the error tally memory 1806. This memory is similar to the check position memory in that it is only capable of storing one pulse or space for each of the twelve channel slots. These pulses and spaces circulate continuously in the memory unless altered by the action of the error gates 1511, 1512 or 1513. The function of the error tally memory is to keep track of the "voting" on the agreement between the check codes registered in the outputs of slicers 1606 through 1610 and the circulating stored codes. The system operates on a two-out-of-three voting arrangement. The first time a discrepancy is noted between the stored code in the talker identity memory and the check code, a pulse is written into the memory to indicate that an error did exist. If a second discrepancy follows, the check code then registered by the digit slicers is substituted for that in the talker-identity memory. If, instead of a second discrepancy, an agreement of the stored and check codes is noted, the error tally pulse is removed from the memory on the basis that the stored talker identity code is correct and that the check code which caused the insertion of the pulse in the error tally memory was incorrect.

The first error tally pulse is inserted by possible-error gate 1512 if the check code and talker identity code in the memory do not agree at the time the pulse from check-now gate 1621 is applied to gate 1512. This insertion can only take place when a space is present in the error tally memory for that channel. If a pulse is stored, it inhibits the operation of gate 1512. When possible-error gate 1512 operates it transfers write tally switch 1515 to its write position and substitutes a pulse for the space in the particular channel time slot. If the check code comparator 1514 indicates agreement when the next check-now pulse for this channel appears, the pulse in the error tally memory operates no-error gate 1511, which in turn operates erase tally switch 1516 and remove the pulse. However, if the check code comparator 1514 indicates a second error, probable-error gate 1513 is enabled. Normally, under these circumstances the pulse from possible-error gate 1513 will pass through check position error gate 1517 to record switches single trip multivibrator 1505. This single trip multivibrator operates the identity code record switches 1901 and thus substitutes the check code registered by the digit slicers 1606 through 1610 for that circulating in the talker identity memory. In order to prevent a second check position pulse from being inserted when an identity code error is corrected, an inhibit lead 1519 from the disconnect slicer 1612 is coupled to the connect code gate 1507. This, of course, does not prevent the insertion of a check pulse when a new assignment is made. The error tally pulse is not removed when an identity code correction is made. This is on the basis that the next check code for this channel will probably be the correct one, but if not, it can be changed immediately to the newly registered code. When the correct code is registered, the no-error gate 1511 will remove the tally pulse.

In order to prevent wholesale wrong connections in the event that a check pulse should become misplaced at the receiver, means are provided for checking the position of the check pulse. When correct signal transmission is present, one of the channels receives alternate sequences of pure disconnect tone and disconnect tone with check code tones. These signals synchronize the check position tracking circuit but may synchronize it in the wrong position if the check pulse should be misplaced. When the check position pulse is stepped around to the channel over which the disconnect tone is being received, an error tally pulse is entered in the error tally circulating memory. The next check is also in error, and operates probable-error gate 1513. This pulse is not permitted to pass through check position error gate 1517 to the record switches control 1505. Instead, the check position error gate 1517 is transferred by a pulse from disconnect switches control single trip multivibrator 1501 which switches the probable-error pulse to the check position error flip-flop multivibrator 1622. This multivibrator opens the stop check switch 1623 and thus removes the improperly positioned check position pulse. Check position error multivibrator 1622 also supplies one of the required inputs for the operation of correct check gate 1624. It is known that one channel is receiving disconnect tone. Therefore, the talker identity code circulating in the memory of the transmitter for that channel must be 00000. During one of the twelve channel check intervals the check code being received is the disconnect tone alone because all of the digit tones are absent. At this time the check group slicer 1619 is deenergized during the disconnect tone interval and remains off during the check interval. When this slicer is operated it inhibits correct check gate 1624 but when it is deenergized, another of the conditions is established for the operation of this gate. Because of the free running action of check duration multivibrator 1905, the check interval timer 1907 is triggered even though slicer 1619 does not operate. The pulse from timer 1907 constitutes another enabling input to the correct check gate 1624. There is then applied to this gate the information that it is time for a check operation to take place, that the check code now being received is the one that should be transmitted over the channel which is receiving disconnect tone and that the last known check code was in error. Clearly, the check pulse must be inserted in the slot of the channel which is receiving disconnect tone. Disconnect switches control single trip multivibrator 1501 produces a pulse each time the slot for the channel over which the disconnect tone is being received appears in the memory output loop.

The pulse from this multivibrator 1501 is, therefore, slightly delayed and completes the enabling of correct check gate 1624. A pulse is, therefore, applied from this gate to "Or" gate 1614 which in turn transfers inject-check-pulse 1615 to the write position and restores the check position pulse to its proper time slot. A pulse from "Or" gate 1614 resets multivibrator 1622 and returns stop-check switch 1623 to normal. In addition, the resetting of multivibrator 1622 disables correct check gate 1624. The check pulse is now in its proper time slot, and the checking operation can proceed.

Figure 20:
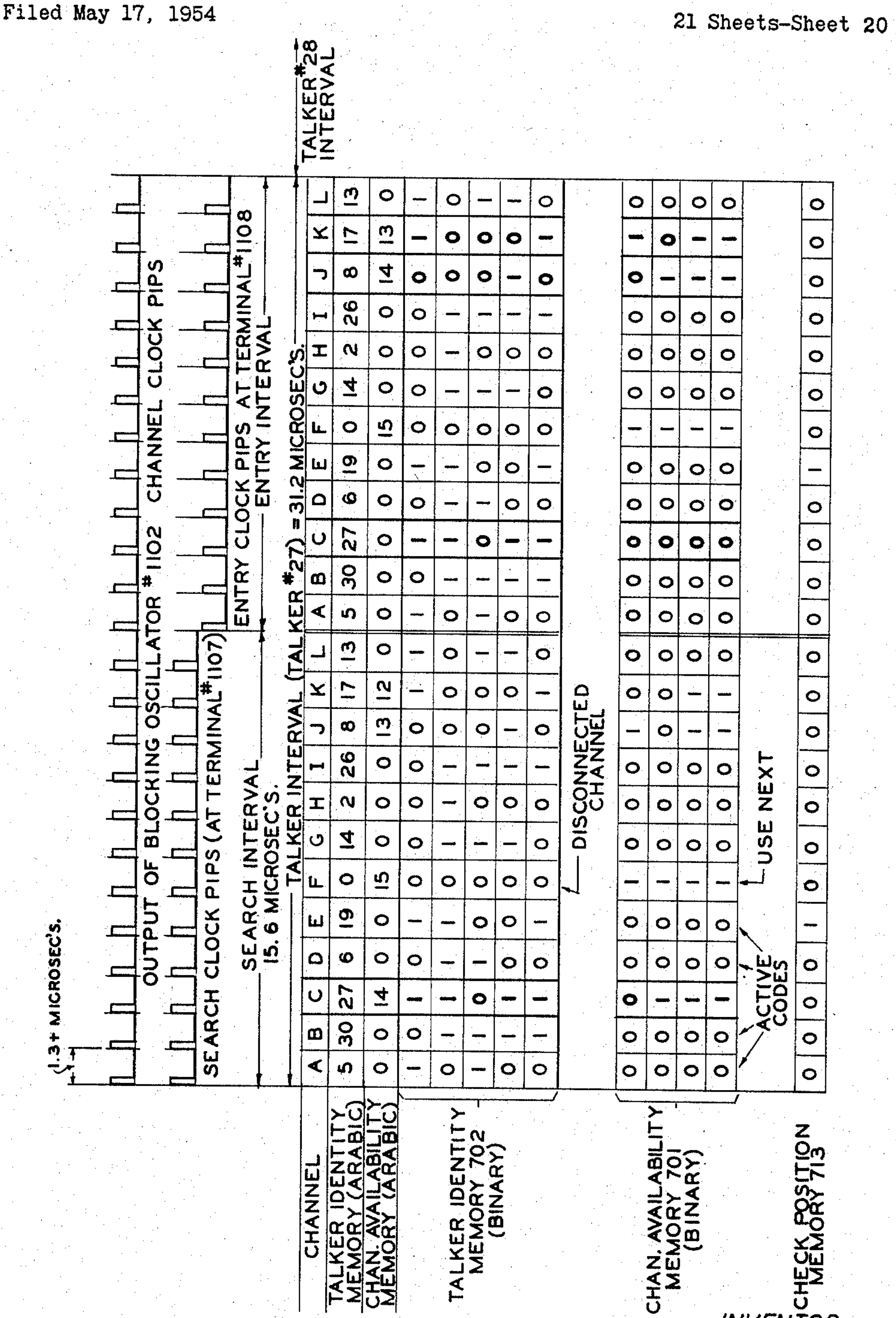
Fig. 20 is a diagram which illustrates the mode of operation of the present TASI system.

The foregoing description of the checking system completes the description of the detailed schematic circuits of Figs. 3 through 19. In Fig. 20, however, the operation of various of the components of the TASI system is presented graphically.

The diagram of Fig. 20 illustrates the timing pulses and the content of the transmitter memory output over one talker interval, which is, of course, equal to two complete revolutions of the circulating memory (302 or 701, 702) and of the distribution commutator (301 or 1115). In the diagram, the arabic numbers shown in the circulating memory 302 are correlated with binary pulses which are actually circulating in the memory units 701, 702 and a specific example of changes made in the course of one talker interval is given.

In Fig. 20, the upper row of pulses represents the output of blocking oscillator 1102. Almost all of the operations in the TASI unit are timed by these pulses and the space between the start of successive pulses represents one channel time slot. These channel clock pips are continuous, and are used to time the code regenerator 705 and the distributor counter 1104, for example. The sets of 12 search pips and 12 entry pips are shown immediately below the clock pips. These pulses are employed at points in the TASI system where operations may occur only during search intervals (the first rotation of the circulating memory 301 or 701, 702) or entry intervals (the second rotation) and not at other times during the cycle.

The channel letter designations A through L which appear below the pulses indicate the synchronism of channel enabling with the channel clock pips. Below the channel letter designations, the contents of the talker identity memory and the channel availability memory are indicated both in arabic and binary notation. In this chart the least significant binary digit appears at the top. The memory pattern shown in this diagram of Fig. 20 is that which appears in the circulating memory unit 402 in the simplified schematic diagram of the transmitter. In the talker identification memory, the numbers other than zero represent various talkers from 1 through 31, and the numeral zero indicates the disconnected channel which will normally be made available to the next active talker. In the channel availability memory, the number zero (binary code 0000) indicates that the channel is active, and the number 15 (binary code 1111) designates the channel which is to be "used next" for a newly active talker. The other numbers in the channel availability memory represent assigned channels which are idle. For convenience in handling the binary numbers, the longest-idle channel is designated number 15 (binary code 1111) and is then disconnected, and the other idle assigned channels are numbered 14, 13, 12, etc., in order of the time at which the channels became idle.

In the example illustrated in Figs. 3 through 5 and 20, channel C is reactivated. Observing the column under channel C in the search interval in Fig. 20, it may be seen that channel C is assigned to talker 27, but that it is designated inactive by the number 14 in the channel availability memory. However, during the search interval, question 1 (Is this talker 27 active?) was answered in the affirmative, and switch 531 was closed. Question 2 (Is this talker 27 assigned to any channel?) was also answered in the affirmative, closing switch 514, but question 3 (Is the channel marked as active?) received a negative answer, closing switch 540 and implementing action B which is to mark the channel active again. This is shown accomplished in the entry interval portion to the right in the diagram of Fig. 20. Specifically, the active code indication "0" has replaced the inactive designation "14" in the channel availability memory and the channel availability numbers less than "14" have been increased by one. These channels C, J, and K have been presented in bolder form in the diagram so that these changes may be readily noted.

For completeness, the lowest line in the diagram of Fig. 20 shows the single pulse in the check position memory. As stated hereinbefore this pulse is stepped around from one channel to the next succeeding channel, starting with the most recently connected channel and checking the balance of the channels one by one until a disconnect signal temporarily interrupts the checking routine.

The TASI transmitter and receiver have been described in terms of the detailed schematic diagrams of Figs. 6 through 19. Many of the logic operations indicated by the boxes in these figures may be instrumented in the manner disclosed in chapter 10 of "The Design of Switching Circuits" by W. Keister, A. E. Ritchie, and S. H. Washburn, D. Van Nostrand Co., Inc., 1951. The flip-flop, or bistable multivibrators, labeled FFMV in the drawings) may be of the general type indicated in Fig. 5.4 on page 164, and the single trip multivibrators may be similar to that shown in Fig. 5.12 of volume 19 of the Radiation Laboratories Series, entitled "Waveforms," which was written for the OSRD, and published by the McGraw Hill Book Co., Inc. in 1949. The amplitude responsive bistable devices, or slicers, used in the present system may be of the type disclosed on page 29 of the Bell System Technical Journal for January 1948, in an article by L. A. Meacham and E. Peterson, entitled "An Experimental Multichannel Pulse Code Modulation System of Toll Quality."

Figure 21A:
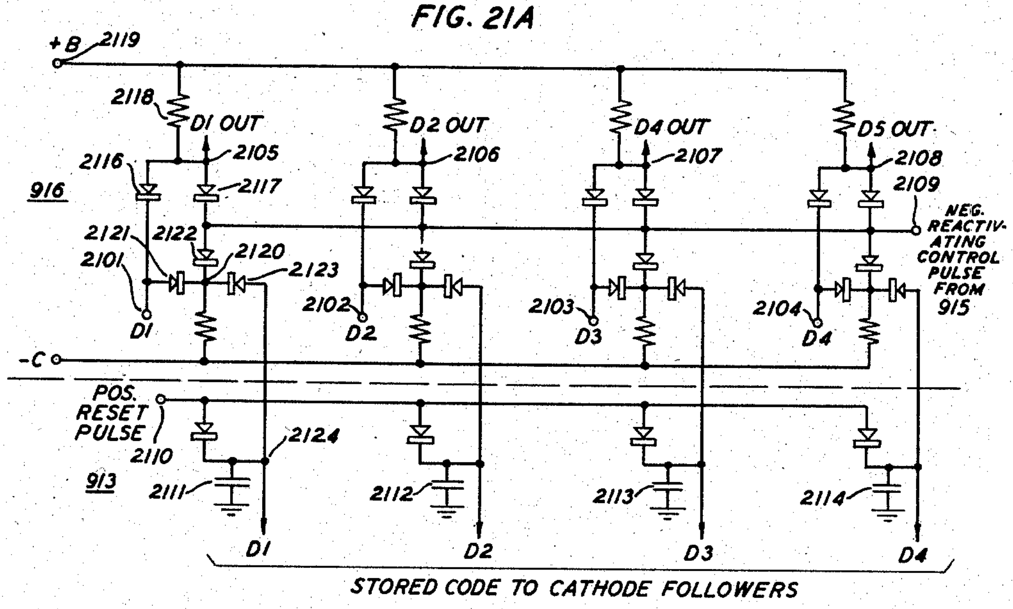
Figs. 21–A, 21–B and 21–C are three logic circuits which appear in the TASI transmitter of Figs. 6 through 13.
Figure 21B:
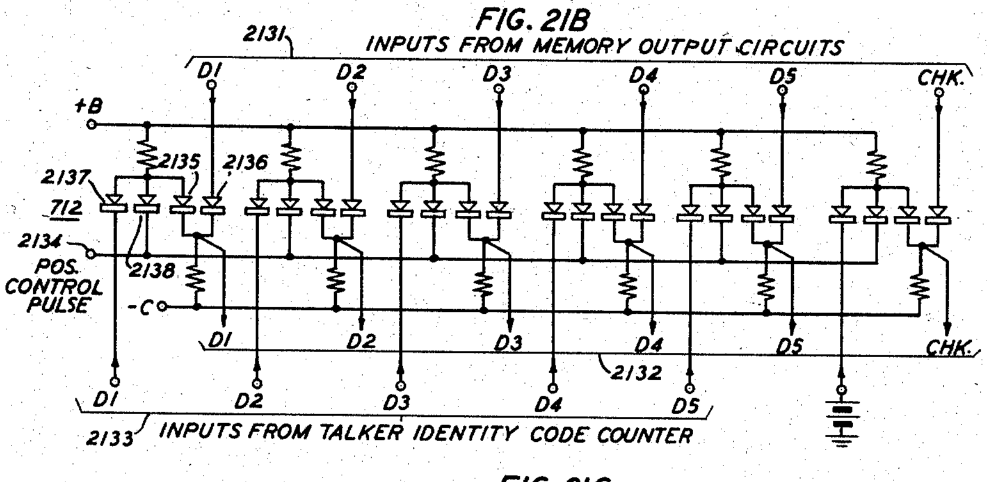
Figure 21C:
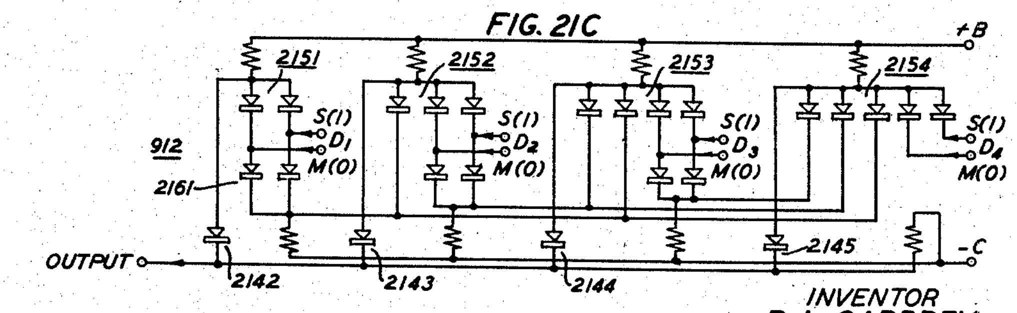

On sheet 21 of the drawings, Figs. 21–A, 21–B, and 21–C show circuit diagrams of the logic circuits in three of the more complex boxes in the detailed schematic diagram. The three illustrated logic circuits are Fig. 21–A, which shows the reactivate switches circuit 916 and a portion of the code storer 913; Fig. 21–B which illustrates the entry switches 712; and Fig. 21–C which shows the "smaller than recognizer" circuit 912.

As discussed in connection with the detailed schematic diagram of the transmitter, the reactivate unit shown in Fig. 21–A normally passes the code indications through from input terminals 2101 thorugh 2104 to the output terminals 2105 through 2108. However, when a negative reactivate pulse is applied to terminal 2109 concurrently with the application of a code to the input terminals 2101 through 2104 of the reactivate switches unit, the active code (0000) is inserted in the circulating memory at the output terminals 2105 through 2108 of the reactivate unit, and the "erased" code input is stored on the condensers 2111 through 2114 at the input of the availability code storer 913.

Inasmuch as each digit is handled individually in this circuit, digit 1 will now be considered by itself. As is well known in the art, the two diodes 2116 and 2117 together with the resistance 2118 and the positive voltage source 2119 constitute a positive "And" gate. This means that the inputs to the diodes at both terminals 2101 and 2109 must be positive in order for the output at terminal 2105 to be positive. With terminal 2109 normally held positive, however, it is clear that the positive input pulses at terminal 2101 are passed directly through the "And" gate to the output terminal 2105. When a negative pulse is applied to terminal 2109, diode 2117 lowers the potential of terminal 2105 and prevents pulses from being passed through from terminal 2101 to the output terminal 2105.

In addition, the negative reactivate control pulse at terminal 2109 stores on condensers 2111 through 2114 the code group of pulses which are simultaneously applied to the input terminals 2101 through 2104. Because the terminal 2109 is normally maintained at a higher positive potential than terminals 2101 or 2124, the diode 2122 is normally conducting while diodes 2121 and 2123 are cut off. This normally holds the positive charge on storage condenser 2111 which is placed there by the positive reset pulse applied to terminal 2110 at the end of each entry interval. When the negative reactivate pulse is applied to terminal 2109, diode 2122 is cut off, and condenser 2111 is discharged through diode 2123 to the level established by the voltage at terminal 2101. Thus, if a coded pulse is present at terminal 2101, condenser 2111 will be maintained charged, while if no pulse is present the condenser will be discharged and terminal 2124 will drop in potential. As indicated by the legend on Fig. 21–A, the code indications stored on condensers 2111 through 2114 are applied to cathode followers (not shown) in the availability code storer 913.

The logic circuit for the entry switches 712 is shown in Fig. 21–B, and is substantially simpler than that of Fig. 21–A. Normally, when the control terminal 2134 is held negative the coded inputs 2131 in the form of positive pulses are connected directly to the output terminals 2132. When a positive control pulse is applied to terminal 2134, however, the coded inputs 2133 from the talker identity code counter are coupled to the code output terminals 2132. This is accomplished by the positive "Or" gate including diodes 2135 and 2136, and the positive "And" gate which includes diodes 2137 and 2138. When terminal 2134 is in its normal negative condition, diode 2138 is conducting and the signal from input 2133 to diode 2137 is effectively blocked. When a positive control pulse is applied to terminal 2134, however (and the inputs 2131 are returned to ground or negative potential by disconnect switches 714), then the coded input 2133 from the talker identity code counter passes directly through the "And" and "Or" switches to the output terminals 2132.

In Fig. 21–C, the logic circuit for the smaller than recognizer box 912 is presented. In this circuit, because of vacuum tube inversion the binary digits at terminals M(0) from the circulating memory are represented by no voltage when a "one" is present and by a positive pulse when a "zero" is present. At the terminals S(1) the binary digits are represented by a positive pulse when a "one" is present and by no voltage when a "zero" is present.

As the name of the circuit suggests, a positive pulse appears at the output terminal 2141 when the binary number circulating in the channel availability memory is smaller than (or equal to) that stored in the availability code storer 913. In the circuit of Fig. 21–C, the diodes 2142 through 2145 constitute an "Or" gate, passing positive pulses through to output terminal 2141 if any are applied to any one of these diodes. In order for a positive pulse to be applied to any of these diodes 2142 through 2145, at least one of the multiple diode "And" gates 2151 through 2154 must be energized.

The operation of the circuit of Fig. 21–C will now be described through the use of two specific examples. First, it will be shown that the circuit yields a positive pulse when it recognizes that the number 7 (binary 0111) in the circulating memory (M) is smaller than the number 8 (binary 1000) stored in the availability code storer (S). With these numbers, positive pulses are present at both $D_1$ inputs, the "And" gate 2151 is triggered, and the diode 2142 passes the positive pulse through to the output terminal 2141. This example shows that when the most significant digit $D_1$ of the code storer is 1 and that of the memory is 0, the balance of the numbers can be ignored.

Considering a more complex example, it will be shown that a positive pulse will be produced when S is equal to binary code number 1100 (arabic 9), and M is 1000 (arabic 8). Following the conditions of this example, a positive pulse is applied to terminal S of digit 1 and no voltage is applied to terminal M of digit 1. Under these circumstances, "And" gate 2151 is not enabled. The subsidiary "Or" gate 2161 is, however, energized and applies a positive voltage to one of the three inputs to the "And" gate 2152. The second digits of the above-identified binary numbers provide the other two positive inputs to the gate 2152 and this gate then yields a positive output voltage, which in turn passes through the diode 2143 and presents a positive voltage at the output terminal 2141. Inasmuch as any combination of numbers applied to the two inputs may be considered by the methods disclosed above, no further permutations of binary numbers will be considered in detail.

As suggested in the course of the foregoing description of the TASI transmitter and receiver, the described system merely represents the facilities for transmission of signals in one direction. Duplicate facilities would, of course, be required for the transmission of signals from the "listeners" to the "talkers" of the described TASI system. The complete system includes a transmitter and a receiver at each terminal location, and suitable hybrid circuits for coupling the individual subscribers' lines to the terminal equipment.

The foregoing detailed description of a TASI system is intended to illustrate the principles of the invention. Many of the subsidiary operations disclosed in the foregoing description may be performed through somewhat different arrangements in accordance with engineering requirements. Specifically, various possible modifications of the transmitter-receiver control circuits will now be briefly described.

In some applications it is desirable to provide as wide an audio transmission band as possible. In this case substantially all of the audio band is used for speech transmission and no space is available above the audio band for the disconnect tone transmission. This objective is achieved with substantially the same apparatus as described hereinabove, by setting aside one of the twelve channels A through L for control data transmission. This channel is made available for speech transmission in periods of full or overload so that no reduction of the number of talkers need be made.

It will be recalled that in the above-described TASI system, one channel is held in the disconnected condition at all times unless at least twelve talkers are actively generating talkspurts. As unassigned talkers become active, the disconnected channel is shifted around to that channel which had been assigned to the longest-idle talker. In the present arrangement, one specific channel is held in the disconnected state during periods when fewer than twelve talkers are active. Whenever a channel advances to the head of the queue of idle assigned channels and becomes that channel assigned to the longest-idle talker, use next recognizer 706 operates not to disconnect the channel by converting the talker identity code to 00000, but instead causes the generation of a four digit code corresponding to the channel which is to be disconnected as indicated by the twelve channel distributor control counter 1104. This code is generated in multitone form in the same manner as for the talker identity code described hereinabove, in connection with Fig. 10 and tone pulser 1307. This four digit code has affixed to it a disconnect tone at the top of the audio band which is sent only over the control channel, and it is sent out over the control channel by an operation similar to that for the check codes. The four digit code identifies the channel to be disconnected next at the time when it is needed by some newly active talker. The receiver sets up the channel code in preparation for making the disconnect when this action is required.

When a new assignment is made after a suitable minimum disconnect interval, the identity code of the newly assigned talker is substituted in the transmitter talker identity code memory in place of the longest-idle talker code. This code is then sent out over the control channel without disconnect tone for as long as the minimum disconnect identity interval single trip multivibrator is operated. The newly assigned channel is held idle during this time to permit clearing of all filters. The arrival of the connect identity code at the receiver is recognized as before by the disappearance of the disconnect tone, and the newly received connect talker identity code is substituted in that channel position which was identified by the immediately preceding disconnect code.

Once the connection has been established, the minimum identity interval single trip multivibrators at the transmitter and receiver turn off. The identification code of the channel to be disconnected next is then sent out and is registered at the receiver for use when required. After this, the regular checking operation is started, with the check codes being identified by a seventh tone transmitted over the control channel along with the check code. It is necessary to use an additional digit tone to distinguish disconnect codes from check codes.

When twelve or more talkers become active, the control channel assigns itself to the new talker in the same fashion as in the "In-Band" control assignment discussed in detail above. As soon as a channel becomes idle, the control channel disconnects itself by sending disconnect tone. It then sends the identification of the idle channel, and the receiver transfers the talker identity code from the control channel to the disconnected channel. This action again makes the control channel available for control purposes.

A form of TASI control which is useful for broad band transmission circuits of the pulse type such as pulse code modulation involves sending the talker activity pattern to the receiver and carrying out a computation on the assignments at the receiver which is identical with the computations made at the transmitter. In this control method it is necessary to operate the transmitter and receiver synchronously, but this is a natural by-product of pulse transmission multiplex methods. The assignment mechanism at the receiver bases its assignments solely on the answer to question 1 (Is this talker active?). The answers to question 2 (Is this talker assigned to any channel?) and question 3 (Is channel marked as active?) which are necessary to take the proper action are generated within the computers at both the receiver and the transmitter, and they are based on the sequence of answers to question 1. The output of question 1 box is the "talker activity pattern." Each of the talkers are considered in turn, and when a talker is deemed to be active, a pulse is produced. When the talker is deemed to be idle a space is produced. This train of thirty-two pulses and spaces is repeated over and over with changes as the activity changes. This talker activity pattern is sent to the receiver over a separate control channel, and it is then used to effect the same operations which are carried out at the transmitter. The transmitter and receiver circuitry are substantially alike with the exception that no activity samplers are required at the receiver, since this data is furnished by the talker activity pattern. All of the coded tone control circuits shown in Figs. 6 through 19 are eliminated because they are replaced by the TAP control.

At the receiver, the talker activity pattern is applied to a TASI control multivibrator in the same order and relative time as its application to this point at the transmitter. The receiving mechanism, therefore, makes the same decisions, and identical talker-to-channel and channel-to-listener connections are established at transmitter and receiver. In order to reduce the control data channel band width to a minimum, the entire system is slowed down so that the twelve channel distribution and collection counters complete a count only 8000 times per second.

It is to be understood that the above-described arrangements are illustrative of the applications of the principles of the invention. Numerous other arrangements may be devised by those skilled in the art without departing from the spirit and scope of the invention.

What is claimed is:

1. In a time assignment signal interpolation system, a plurality of signal sources, means providing a lesser plurality of multiplex transmission channels, timing means for enabling said transmission channels in regular succession, a register, means for asynchronously reading into said register identifications of those signal sources which are instantaneously active to provide registrations, means, synchronized with said enabling means and controlled by said registrations, for successively gating said sources into said channels, and means for maintaining connections between sources and channels after registered sources have become inactive until a given registered source is the longest-idle registered source.

2. In a time assignment signal interpolation system, a plurality of signal sources, means providing a lesser plurality of multiplex transmission channels, timing means for enabling said transmission channels in regular succession, a register, means for asynchronously reading into said register identifications of those signal sources which are intantaneously active to provide registrations, means, synchronized with said enabling means and controlled by said registrations, for successively gating said sources into said channels, means for maintaining connections between sources and channels after registered sources have become inactive until a given registered source is the longest-idle registered source, and means for disconnecting the channel associated with the longest-idle registered talker and holding it in readiness for assignment to a newly active source.

3. In combination, a plurality of signal sources, a lesser plurality of output circuits, a common multiplex channel for interconnecting said sources and said circuits, a first group of diode gates for coupling said sources to said common channel, a first switching matrix connected to said first group of diode gates, a second group of diode gates for coupling said output circuits to said common channel, circuit means including a second switching matrix for energizing said second group of diode gates in succession, a plurality of circulating delay loops, means for asynchronously reading into said delay loops pulse identifications of those signal sources which are instantaneously active, and circuit means connecting the output of said delay loops to said first switching matrix for gating specific signal sources into said multiplex channel synchronously with the successive gating of said output circuits.

4. In combination, a plurality of signal sources, a lesser plurality of transmission channels, means for determining the signal activity or inactivity of said sources, register means for registering indications of active signal sources as determined by said last-named means, means controlled by said indications for recurrently gating each one of said active sources into a unique one of said channels in response to a number of active signal sources less than the number of channels, and means operative only in response to a number of active sources greater than the number of channels for recurrently gating more than one of said active sources into at least some of said channels on a time sharing basis.

5. In a time assignment speech interpolation system, a plurality of signal sources, one and only one signal sampling gate connected to each of said signal sources, a lesser plurality of transmission channels, one and only one signal distributing gate connected to each of said transmission channels, a common signal transmission path interconnecting said signal sampling gates and said signal distributing gates, information storage means having a storage position corresponding to each of said transmission channels, means for reading into said storage means a coded identification of each of said signal sources as it becomes active to provide assignments of said sources to said channels, means for recurrently enabling said signal distributing gates in regular rotation, and means, synchronized with said enabling means and controlled by said assignments, for enabling each of said signal sampling gates simultaneously with the enablement of its assigned transmission channel distributing gate.

6. The combination according to claim 5 further including means for retaining said coded identifications in said storage positions after said signal sources have become inactive.

7. The combination according to claim 6 further including means for erasing from said storage positions identifications of inactive ones of said signal sources, means for identifying the storage position of the assigned signal source of longest inactivity, and means for restricting the operation of said erasing means to said last-named storage position.

8. The combination according to claim 5 further including means for transmitting the coded identification stored in each of said storage positions over its corresponding transmission channel whereby said assignments are identified.

9. The combination according to claim 8 further including means for consecutively transmitting the coded identifications stored in all of said storage positions over a single transmission channel whereby said assignments may be verified.

10. The combination according to claim 9 further including means for identifying the storage position of the assigned signal source of longest inactivity, and means for transmitting said successive coded identifications over the transmission channel corresponding to said last-named storage position.

11. A time assignment speech interpolation system comprising a plurality of signal sources, a lesser plurality of transmission channels, a single transmission path connecting said sources to said channels, means for assigning each active signal source to a unique one of said transmission channels for at least the duration of activity of said active signal source, and means, responsive to said assigning means, for recurrently establishing electrical connections over said transmission path between each of said active signal sources and its assigned transmission channel for intervals substantially less than said duration of activity.

12. In combination with the time assignment speech interpolation system according to claim 11, means for maintaining assignments of said active signal sources to said unique channels for intervals substantially greater than said duration of activity.

13. In a time assignment signal interpolation system, a plurality of signal translation devices, a lesser plurality of signal transmission means, and time division switching means interconnecting said signal translation devices and said signal transmission means, said switching means comprising one and only one signal translation gate having a first terminal connected to each of said signal translation devices, one and only one signal transmission gate having a first terminal connected to each of said signal transmission means, a common electrical bus interconnecting the second terminals of said signal translation gates with the second terminals of said signal transmission gates, means for recurrently enabling said signal transmission gates in successive time intervals, means for assigning the signal translation gate of each active one of said signal translation devices to a unique one of said time intervals, and means responsive to said assigning means for enabling each of said signal translation gates only during its assigned time interval.

14. The combination according to claim 13 further including means for maintaining said assignments after said signal translation devices become inactive.

15. In a time assignment speech interpolation system, a plurality of signal sources, a lesser plurality of output channels, one and only one signal transmission path interconnecting all of said signal sources and all of said output channels, means for generating a binary code identification of each of said signal sources as it becomes active, means for generating a binary code indication of the availability of each of said output channels, information storage means corresponding to each of said channels, means for reading said availability codes for each of said channels into the corresponding information storage means, means responsive to said availability codes for reading each of said identification codes into a unique one of said information storage means thereby to provide assignments of identified sources to available channels, means responsive to said information storage means for gating said identified sources into said transmission path in succession and means for simultaneously gating the assigned channels into said transmission path.

16. The combination according to claim 15 further including means for translating each of said identification codes into a unique multifrequency tone burst and means for transmitting each of said multifrequency tone bursts over the output channel assigned to the identified signal source.

17. The combination according to claim 15 further including means for retaining said coded identifications in said information storage means after said signal sources have become inactive, means for counting unused output channels, means responsive to said counting means for erasing at least one of said coded identifications from said information storage means when and only when said count reaches a predetermined number, and means for transmitting an identification of the output channel corresponding to the information storage means so erased.

18. The combination according to claim 17 further including means for transmitting the contents of said information storage means in succession over said output channel corresponding to said erased information storage means.

19. In combination, a plurality of signal transmission channels, a greater plurality of signal sources and corresponding signal utilization devices, first time division switching means interconnecting said sources and said channels, said first switching means comprising one and only one source sampling gate connected by one terminal to each of said sources, one and only one transmission gate connected by one terminal to one end of each of said channels, first common transmission means connecting the other terminals of said source sampling gates to the other terminals of said transmission gates, means for assigning only active ones of said signal sources to unique ones of said transmission channels, first means responsive to said assigning means for enabling signal sampling gates of assigned sources and transmission gates of assigned channels in synchronism; second time division switching means interconnecting said channels and said utilization devices, said second switching means comprising one and only one channel sampling gate connected by one terminal to the other end of each of said channels, one and only one distributing gate connected by one terminal to each of said utilization devices, second common transmission means connecting the other terminals of said channel sampling gates to the other terminals of said distributing gates, and second means responsive to said assigning means for enabling channel sampling gates of assigned channels and distributing gates of utilization devices corresponding to assigned sources in synchronism.

20. The combination according to claim 19 in which said assigning means comprises means for generating binary coded identifications of said signal sources as they become active, information storage means corresponding to each of said transmission channels, means for reading each of said identification codes into a unique one of said information storage means, and means for transmitting each identification code so read over the transmission channel corresponding to said unique information storage means.

21. The combination according to claim 20 further including means for maintaining said identification codes in said information storage means after said signal sources have become inactive, means for erasing at least one of said coded identifications from said information storage means in response to a number of active sources greater than the number of channels, and means for transmitting an indication of each identification code so erased.

22. The combination according to claim 19 further including means responsive to said assigning means for encoding and transmitting each of said assignments to said second time division switching means twice in succession, means for comparing said transmitted assignments with the gating operations of said second enabling means, and means for altering the gating operations of said second enabling means to conform with said transmitted assignments only when said two successive transmitted assignments are identical and do not conform with the gating operations of said second enabling means.

23. The combination according to claim 19 further including audio filter means in each of said transmission channels, said second enabling means including means for enabling said channel sampling gates and said distributing gates asynchronously with respect to said first enabling means.

References Cited in the file of this patent

UNITED STATES PATENTS

| | | |
|---|---|---|
| 2,490,833 | Ransom | Dec. 13, 1949 |
| 2,541,932 | Melhose | Feb. 13, 1951 |
| 2,577,141 | Mauchly et al. | Dec. 4, 1951 |
| 2,651,678 | Edwards et al. | Sept. 8, 1953 |
| 2,727,094 | Flowers et al. | Dec. 13, 1955 |